(12) United States Patent (10) Patent No.: US 11,467,175 B2
Yamamoto et al. (45) Date of Patent: Oct. 11, 2022

(54) ANALYSIS DEVICE AND POSITIONING METHOD

(71) Applicant: ARKRAY, Inc., Kyoto (JP)

(72) Inventors: Akihiro Yamamoto, Kyoto (JP); Shigeru Kitamura, Kyoto (JP); Naoto Shichi, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 246 days.

(21) Appl. No.: 16/172,243

(22) Filed: Oct. 26, 2018

(65) Prior Publication Data

US 2019/0128914 A1 May 2, 2019

(30) Foreign Application Priority Data

Oct. 30, 2017 (JP) .............................. JP2017-209706

(51) Int. Cl.
*G01N 35/10* (2006.01)
*B01L 9/00* (2006.01)
(Continued)

(52) U.S. Cl.
CPC .......... *G01N 35/1011* (2013.01); *B01L 9/527* (2013.01); *G01N 35/00029* (2013.01);
(Continued)

(58) Field of Classification Search
CPC ........... G01N 35/1011; G01N 35/0029; G01N 2035/00039; G01N 35/1095;
(Continued)

(56) References Cited

U.S. PATENT DOCUMENTS

| 5,334,585 A | 8/1994 | Derian et al. |
| 5,659,421 A * | 8/1997 | Rahmel .................. G02B 21/26 |
| | | 359/391 |

(Continued)

FOREIGN PATENT DOCUMENTS

| JP | H05-092901 A | 4/1993 |
| JP | 2009-521684 A | 6/2009 |

(Continued)

OTHER PUBLICATIONS

Extended European Search Report issued by the European Patent Office dated Jan. 7, 2019, which corresponds to EP18202898.5-1101 and is related to U.S. Appl. No. 16/172,243.

(Continued)

*Primary Examiner* — Jill A Warden
*Assistant Examiner* — John McGuirk
(74) *Attorney, Agent, or Firm* — Studebaker & Brackett PC

(57) ABSTRACT

An analysis device employs an analysis kit including a chip provided with a capillary through which a sample flows and a cartridge superimposed on the chip and provided with a liquid reservoir. The analysis device includes a guide-in section into which the analysis kit is guided, a placement section on which the analysis kit placed so as to be supported, a pusher member that pushes the analysis kit from one side face of the analysis kit, contact members that oppose another side face on an opposite side in the horizontal direction to the one side face of the analysis kit placed on the placement section, and contact the other side face of the analysis kit being pushed in by the pusher member so as to position the analysis kit in the horizontal direction, and a measurement member that measures a component present in the sample in the analysis kit.

3 Claims, 26 Drawing Sheets

(51) Int. Cl.
*G01N 35/00* (2006.01)
*B01L 3/00* (2006.01)

(52) U.S. Cl.
CPC .... *G01N 35/1095* (2013.01); *B01L 3/502715* (2013.01); *B01L 2200/025* (2013.01); *B01L 2200/027* (2013.01); *B01L 2200/16* (2013.01); *B01L 2300/047* (2013.01); *B01L 2300/0672* (2013.01); *B01L 2400/0487* (2013.01); *B01L 2400/0683* (2013.01); *G01N 2035/00039* (2013.01); *G01N 2035/00158* (2013.01); *G01N 2035/1037* (2013.01)

(58) Field of Classification Search
CPC . G01N 2035/00158; G01N 2035/1037; G01N 35/00029; B01L 9/527; B01L 2200/16; B01L 3/502715; B01L 2400/0683; B01L 2400/0487; B01L 2200/027; B01L 2300/047; B01L 2300/0672; G02B 21/34
See application file for complete search history.

(56) References Cited

U.S. PATENT DOCUMENTS

| | | | | |
|---|---|---|---|---|
| 2001/0045358 | A1* | 11/2001 | Kopf-Sill | G01N 35/0099 204/452 |
| 2002/0114735 | A1* | 8/2002 | Markart | B01L 9/52 422/68.1 |
| 2006/0213291 | A1* | 9/2006 | Sando | B01F 25/433 73/866.5 |
| 2007/0166196 | A1 | 7/2007 | Bardell et al. | |
| 2010/0014947 | A1* | 1/2010 | Kehrer | G01N 35/0099 414/222.04 |
| 2012/0071342 | A1* | 3/2012 | Lochhead | G01N 21/6452 506/9 |
| 2013/0221544 | A1 | 8/2013 | Sekihara | |
| 2014/0349381 | A1* | 11/2014 | Battrell | G01N 21/6452 435/287.2 |
| 2016/0147056 | A1* | 5/2016 | Corwin | G02B 27/32 359/391 |

FOREIGN PATENT DOCUMENTS

| | | |
|---|---|---|
| JP | 2012-073198 A | 4/2012 |
| JP | 2012-093350 A | 5/2012 |
| JP | 2012-229932 A | 11/2012 |
| WO | WO-03083469 A2 * 10/2003 | ....... A61B 5/150068 |
| WO | 2012/057102 A1 | 5/2012 |

OTHER PUBLICATIONS

An Office Action mailed by the European Patent Office dated Nov. 13, 2019, which corresponds to European Patent Application No. 18202898.5-1101 and is related to U.S. Appl. No. 16/172,243.

An Office Action; "Notice of Reasons for Refusal", mailed by the Japanese Patent Office dated Mar. 23, 2021, which corresponds to Japanese Patent Application No. 2017-209706 and is related to U.S. Appl. No. 16/172,243; with English language translation.

* cited by examiner

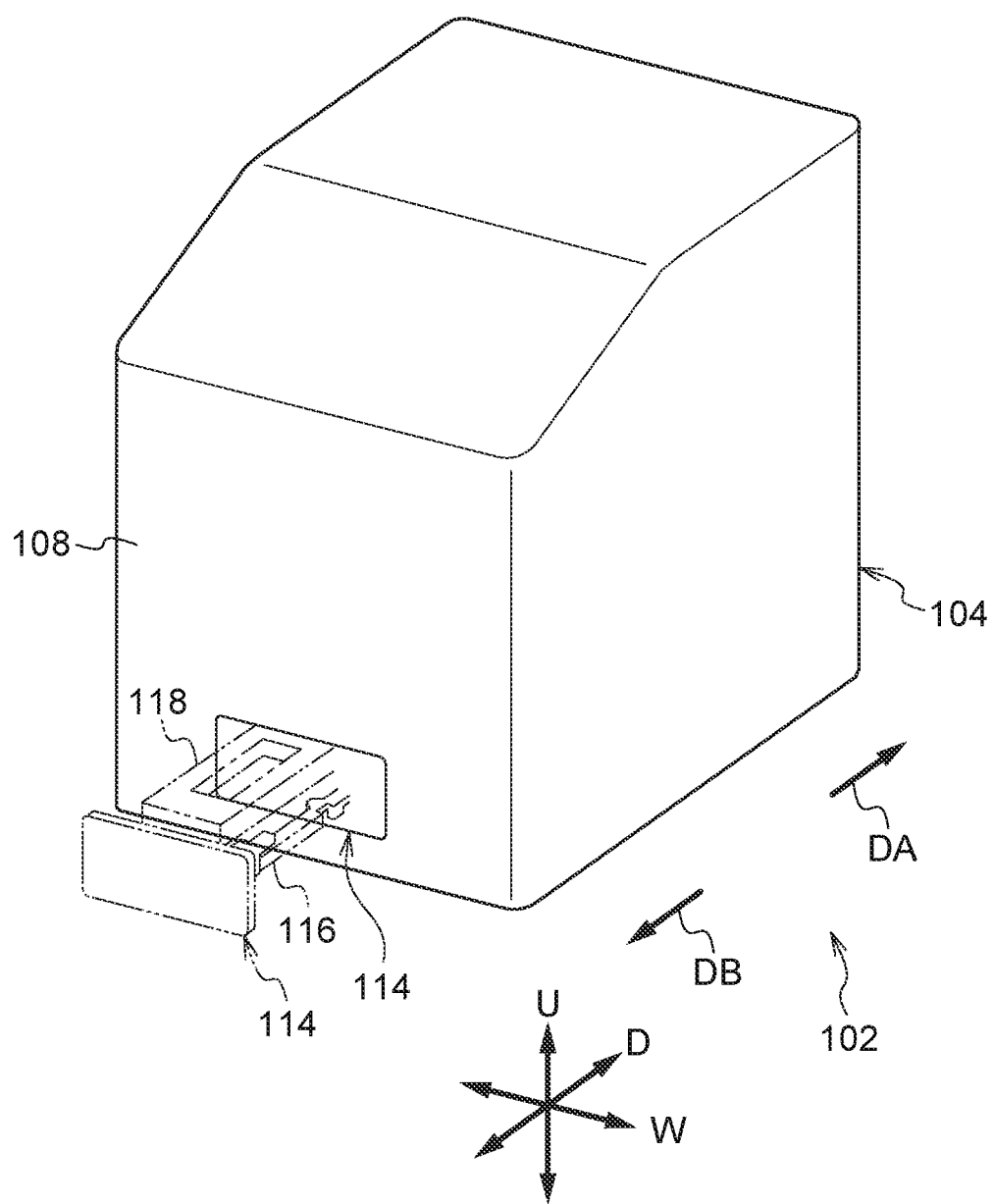

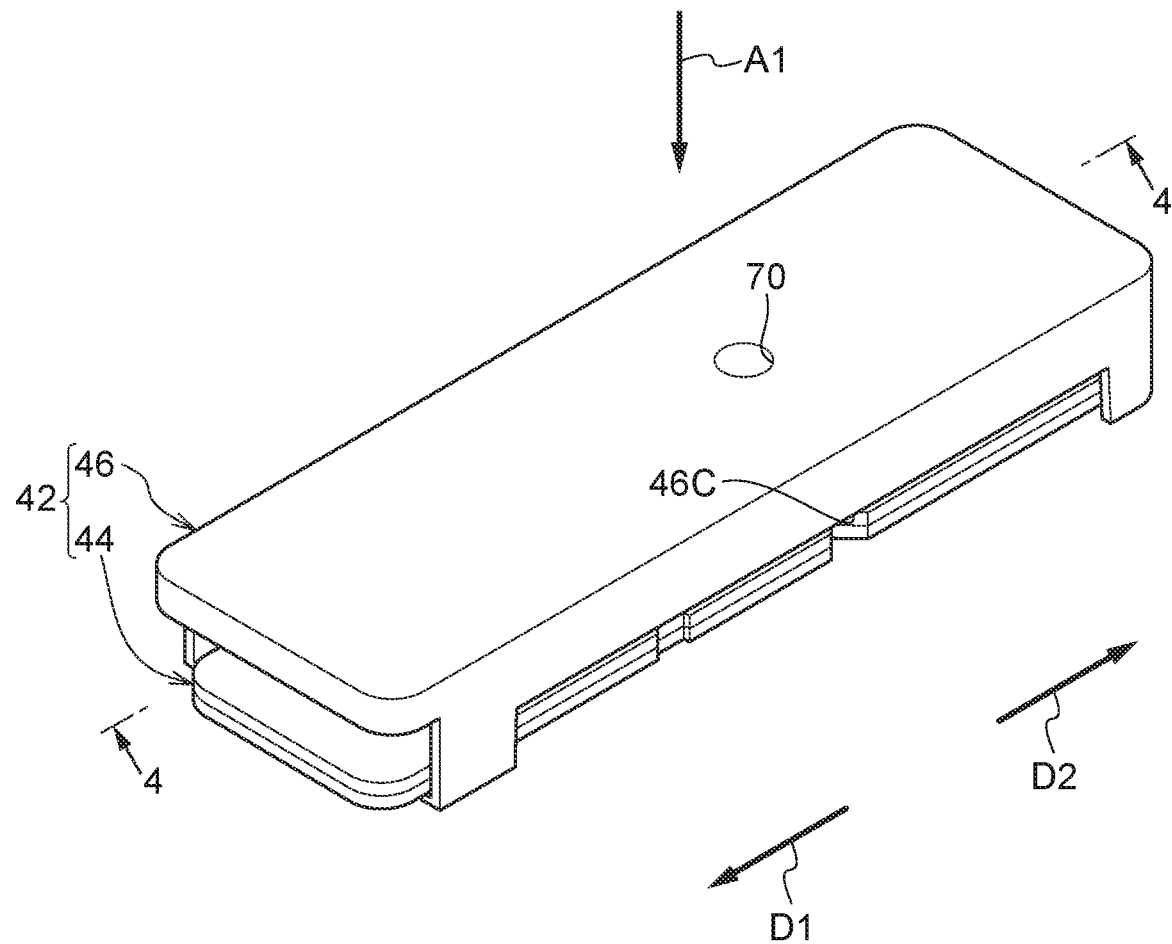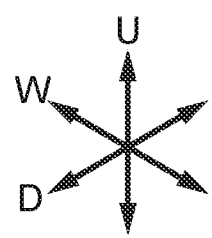

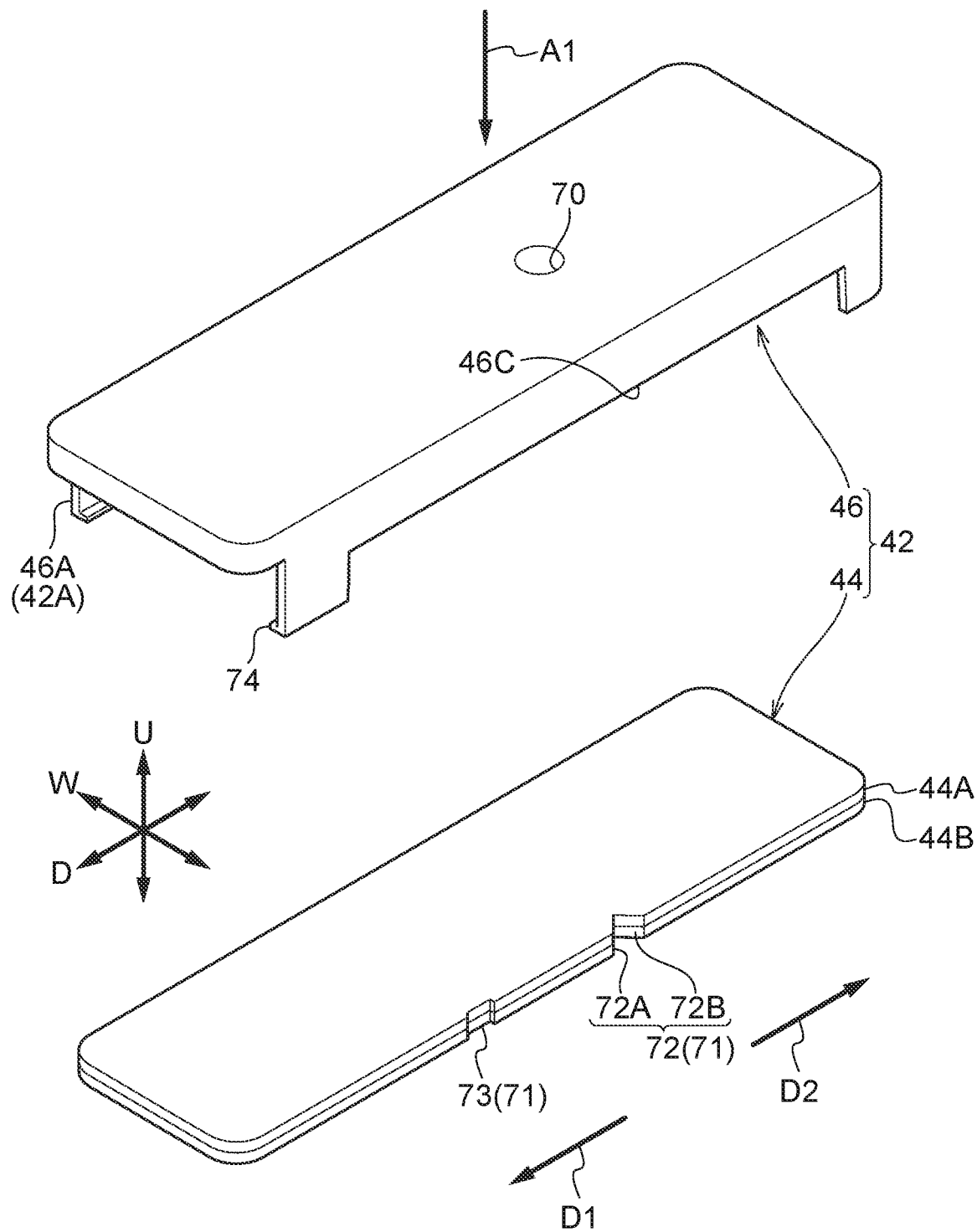

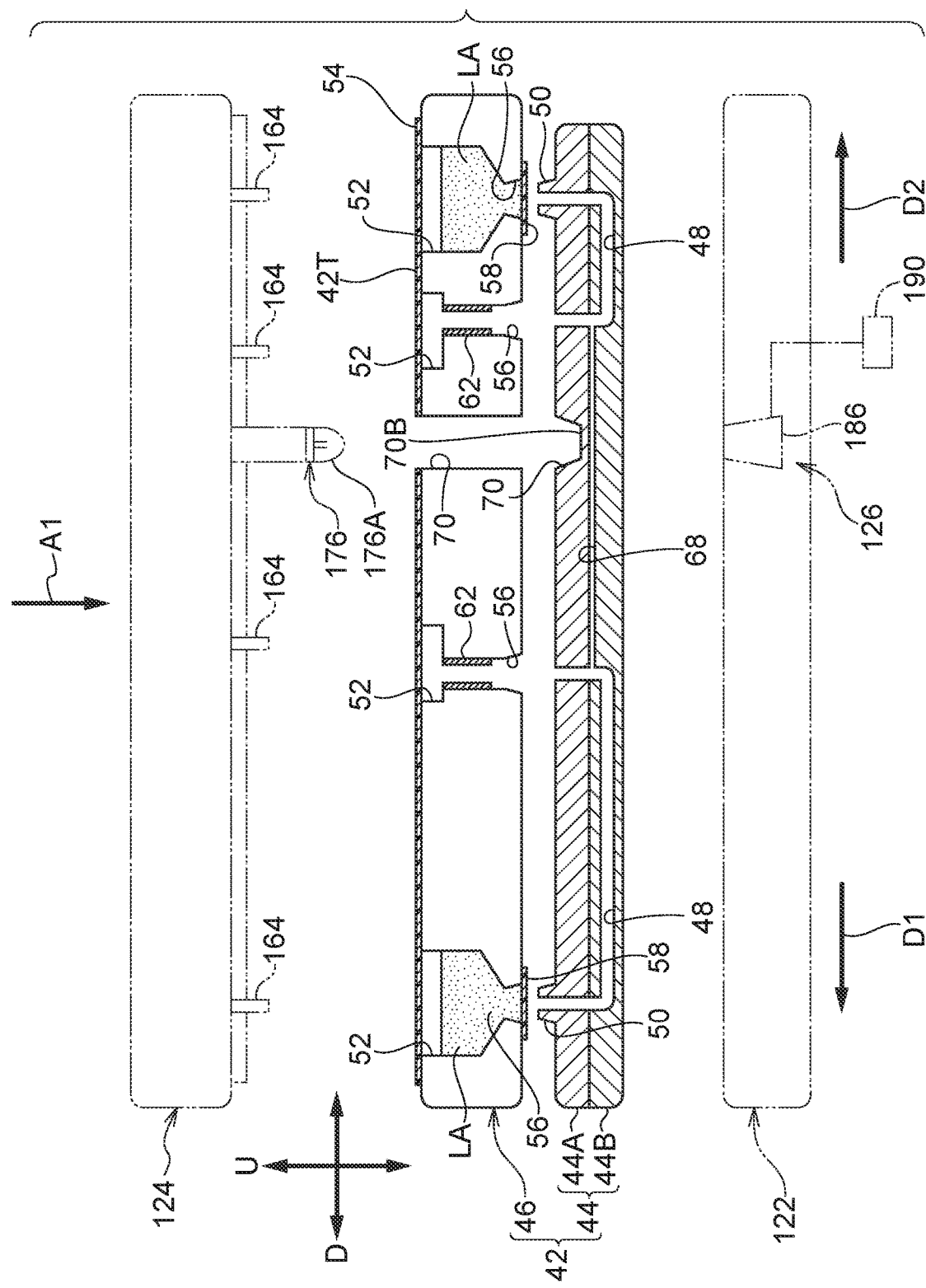

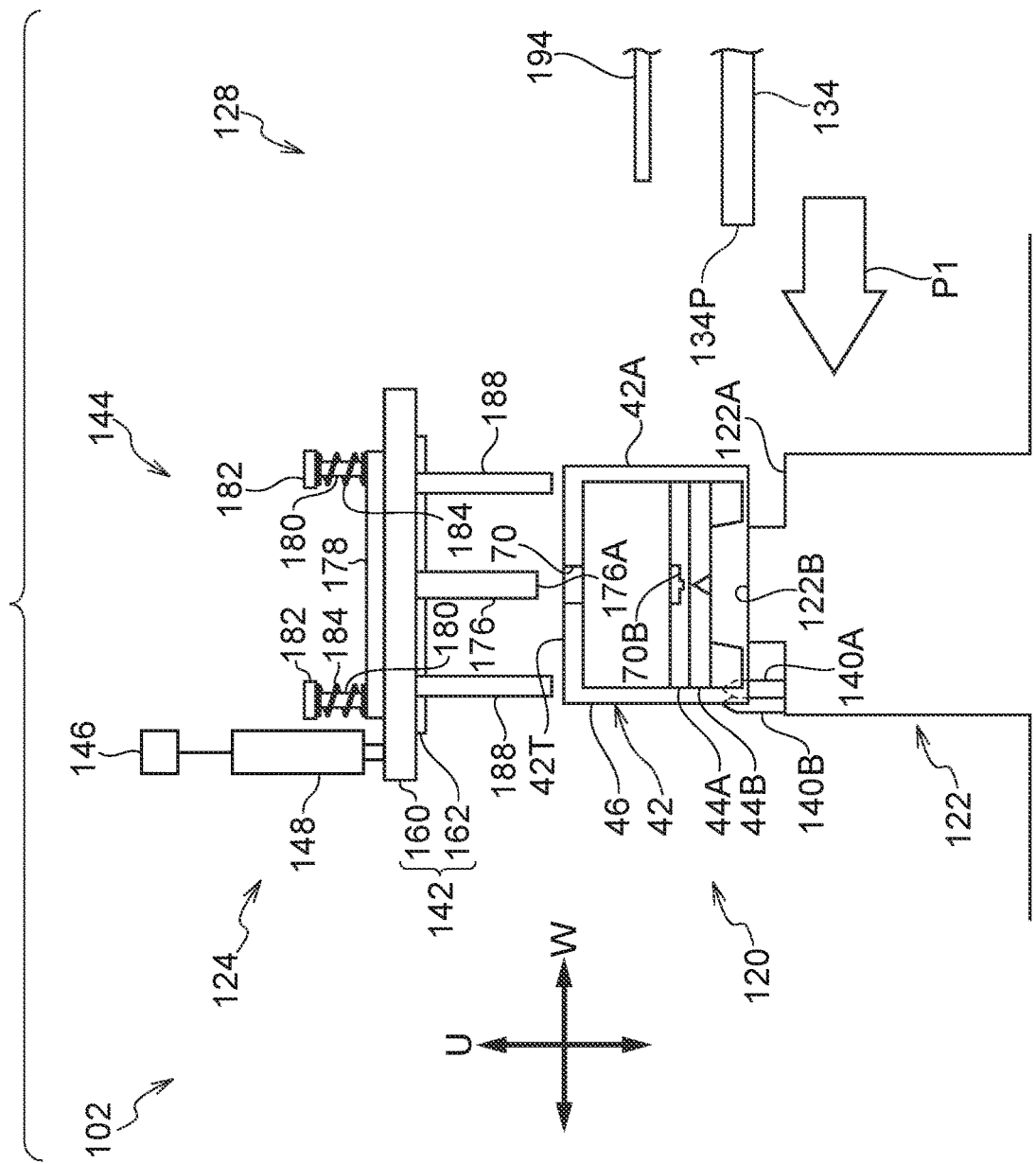

ANALYSIS DEVICE AND POSITIONING METHOD

CROSS-REFERENCE TO RELATED APPLICATION

This application is based on and claims priority under 35 USC 119 from Japanese Patent Application No. 2017-209706 filed on Oct. 30, 2017, the entire contents of which is incorporated by reference herein.

BACKGROUND

Technical Field

The present application relates to an analysis device and a positioning method.

Background Art

An analysis device for analyzing a component present in a sample is described in Japanese Patent Application Laid-Open (JP-A) No. 2012-093350, where a device in which capillary electrophoresis is induced in the sample in a chip, and component analysis is performed by measuring transmitted light or reflected light from light illuminated onto the sample.

In such an analysis device, if the chip is not accurately positioned within the analysis device, the measurement precision of component analysis might suffer. Accurate chip positioning is therefore demanded.

SUMMARY

The present application is directed to performing accurate positioning of an analysis kit in an analysis device.

One aspect of the present application is an analysis device employing an analysis kit including a chip provided with a capillary through which a sample flows, and a cartridge superimposed on the chip in a vertical direction and provided with a liquid reservoir. The analysis device includes a guide-in section, a placement section, a pusher member, a contact member, and a measurement member. The analysis kit containing the sample is guided into the guide-in section. The analysis kit in the guide-in section is placed on the placement section so as to be supported in the vertical direction. The pusher member pushes the analysis kit placed on the placement section from one side face of the analysis kit, the one side face being disposed on one horizontal direction side of the analysis kit as defined with respect to the vertical direction. The contact member opposes another side face on an opposite side in the horizontal direction to the one side face of the analysis kit placed on the placement section, and contacts the other side face of the analysis kit being pushed in by the pusher member so as to position the analysis kit in the horizontal direction. The measurement member measures a component present in the sample in the analysis kit guided into the guide-in section. Moreover, the contact member contacts the chip.

Another aspect of the present application is a positioning method to position an analysis kit including a chip provided with a capillary through which a sample flows and a cartridge superimposed on the chip in a vertical direction and provided with a liquid reservoir. The positioning method includes guiding the analysis kit into a guide-in section so as to be supported in the vertical direction on a placement section of the guide-in section, pushing a face on one side of the analysis kit in a horizontal direction as defined with respect to the vertical direction, and causing another side face on an opposite side of the analysis kit in the horizontal direction to the one side face to contact a contact member.

The embodiments enable accurate positioning of an analysis kit in an analysis device.

BRIEF DESCRIPTION OF DRAWINGS

FIG. 1 is a perspective view illustrating external configuration of an analysis device of a first exemplary embodiment.

FIG. 2 is a perspective view illustrating an analysis kit employed for analysis in an analysis device.

FIG. 3 is an exploded perspective view of the analysis kit illustrated in FIG. 2.

FIG. 4 is a cross-section of the analysis kit, taken along line 4-4 in FIG. 2.

FIG. 5 is a front view illustrating a guide-in section and the vicinity thereof inside the analysis device of the first exemplary embodiment.

DESCRIPTION OF EMBODIMENTS

First Exemplary Embodiment

Figure 6:
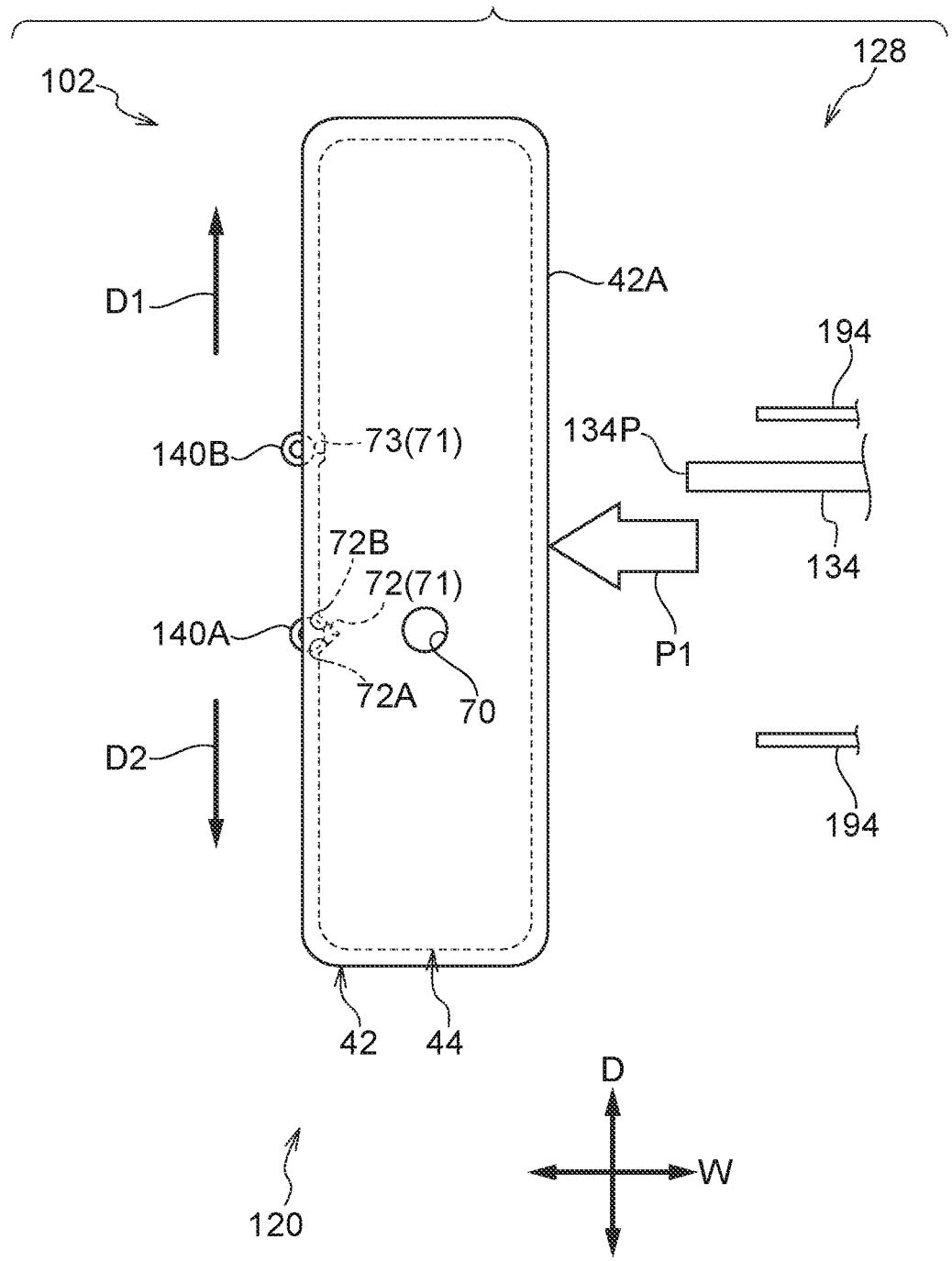
FIG. 6 is a plan view illustrating a guide-in section and the vicinity thereof inside the analysis device of the first exemplary embodiment.

Explanation follows regarding an analysis device of a first exemplary embodiment, with reference to the drawings. The analysis device of the first exemplary embodiment is, for example, a device used to analyze the amount of glycated hemoglobin present in blood. Blood is one example of a sample, which is also referred to as a "specimen." Glycated hemoglobin is one example of an analysis target of the analysis device.

External Configuration of the Analysis Device

As illustrated in FIG. 1, an analysis device 102 includes a casing 104. In the first exemplary embodiment, the casing 104 is formed in a substantially rectangular box shape. In the following explanation, a vertical direction, a width direction, and a depth direction of the analysis device 102 are respectively indicated by an arrow U, an arrow W, and an arrow D. The arrow W direction, the arrow D direction, and directions with both arrow W direction and arrow D direction components are all horizontal directions. The far side and near side in the depth direction of the analysis device 102 are respectively indicated by an arrow DA and an arrow DB.

The casing 104 is provided with a touch panel not illustrated in the drawings. A technician performing an analysis task is able to operate the analysis device 102 by touching the touch panel while referring to information displayed on the touch panel.

The casing 104 is also provided with a printer not illustrated in the drawings. The analysis device 102 is capable of printing analysis results for a sample using the printer.

A near face 108 of the casing 104 is provided with an opening/closing cover 114. The opening/closing cover 114 is capable of sliding between a projecting position illustrated by double-dotted dashed lines, in which the opening/closing cover 114 has been moved toward the near side by an opening/closing mechanism 116, and a loaded position illustrated by a solid line in which the opening/closing cover 114 has been moved toward the far side so as to lie in the same plane as the near face 108. When the opening/closing cover 114 is in the projecting position, a tray 118 and the opening/closing cover 114 are exposed at the near side of the casing 104. An analysis kit 42 containing a specimen or sample can be placed on this tray.

Analysis Kit Configuration

As illustrated in FIG. 2 to FIG. 4, as an example, the analysis kit 42 of the first exemplary embodiment has a structure including a chip 44 and a cartridge 46. The analysis kit 42 is set on the tray 118 of the analysis device 102 in a state in which the cartridge 46 is superimposed over the chip 44, with the arrow D1 side on the far side. In the analysis kit 42, for convenience, the vertical direction, width direction, and depth direction in a state in which the analysis device 102 has been set in the tray 118 are labeled with the arrow U, arrow W, and arrow D respectively. The far side and the near side of the analysis kit 42 are labeled with the arrow D1 and the arrow D2 respectively.

The chip 44 is formed by sticking together two plates, an upper plate 44A and a lower plate 44B, that have the same external profile as each other in plan view as viewed along the arrow A1 direction. In a state in which the plates 44A, 44B have been stuck to each other, the chip 44 configures a plate shaped member. When the chip 44 is lying in a horizontal state, the plate thickness direction of the chip 44 is aligned with a vertical direction. The cartridge 46 is superimposed on the chip 44 in the vertical direction, namely in the plate thickness direction of the chip 44.

The chip 44 is formed with plural channels 48.

The cross-section profile of the channels 48, and the layout of the channels 48 in plan view of the chip 44, are not limited. The channels 48 may bend at one or more locations, or may be straight.

The flow path cross-section area of the channels 48 is set such that when pressure is applied to a liquid by a pump 172, described later with respect to FIG. 11, the pressurized liquid flows through the channels 48.

A protrusion 50 that projects toward the cartridge 46 is formed at an end portion of each channel 48. As described later, the protrusion 50 is an example of a piercing projection that pierces a bottom-face film 58.

The cartridge 46 is formed with plural liquid reservoirs 52.

Each liquid reservoir 52 is a recess formed in an upper portion of the cartridge 46. Upper faces of the liquid reservoirs 52 are sealed off by a sealing film 54. In the first exemplary embodiment, as illustrated in FIG. 4, the plural liquid reservoirs 52 are sealed off by a single sealing film 54. However, individual sealing films 54 may be provided for each liquid reservoir 52. It is sufficient that the material of the sealing film 54 seals the liquid sealed in the liquid reservoirs 52 to prevent evaporation of the liquid, and that the sealing film 54 is pierced by a piercing member provided to the analysis device, described later. One example of such a material is a laminate film with a multi-layered structure, with one or more layers of the multi-layered structure including, but not limited to, PET.

Communication portions 56 that place the liquid reservoirs 52 in communication with the channels of the chip 44 are formed in a lower portion of each of the liquid reservoirs 52. Liquid LA, such as a diluent or a migration liquid, is encapsulated in some of the plural liquid reservoirs 52. Lower portions of the communication portions 56 of the liquid reservoirs 52 encapsulating the liquid are each sealed off using the bottom-face film 58.

Note that a filter may be provided upstream of a capillary 68, described later, in the flow of the liquid in the channels 48 of the chip 44. Such a filter enables a structure to be achieved in which foreign matter other than the liquid is removed and does not flow into the capillary 68.

The capillary 68 is formed between channels 48 that each correspond to two specific communication portions 56 of two specific liquid reservoirs 52 from out of the plural liquid reservoirs 52. The flow path cross-section area of the capillary 68 is set such that liquid present in the channels 48 flows through the capillary 68 due to capillary action. Accordingly, the flow path cross-section area of the capillary 68 is smaller than the flow path cross-section area of any of the channels 48. Electrodes 62 are provided to the communication portions 56 on either side of the capillary 68.

Figure 21:
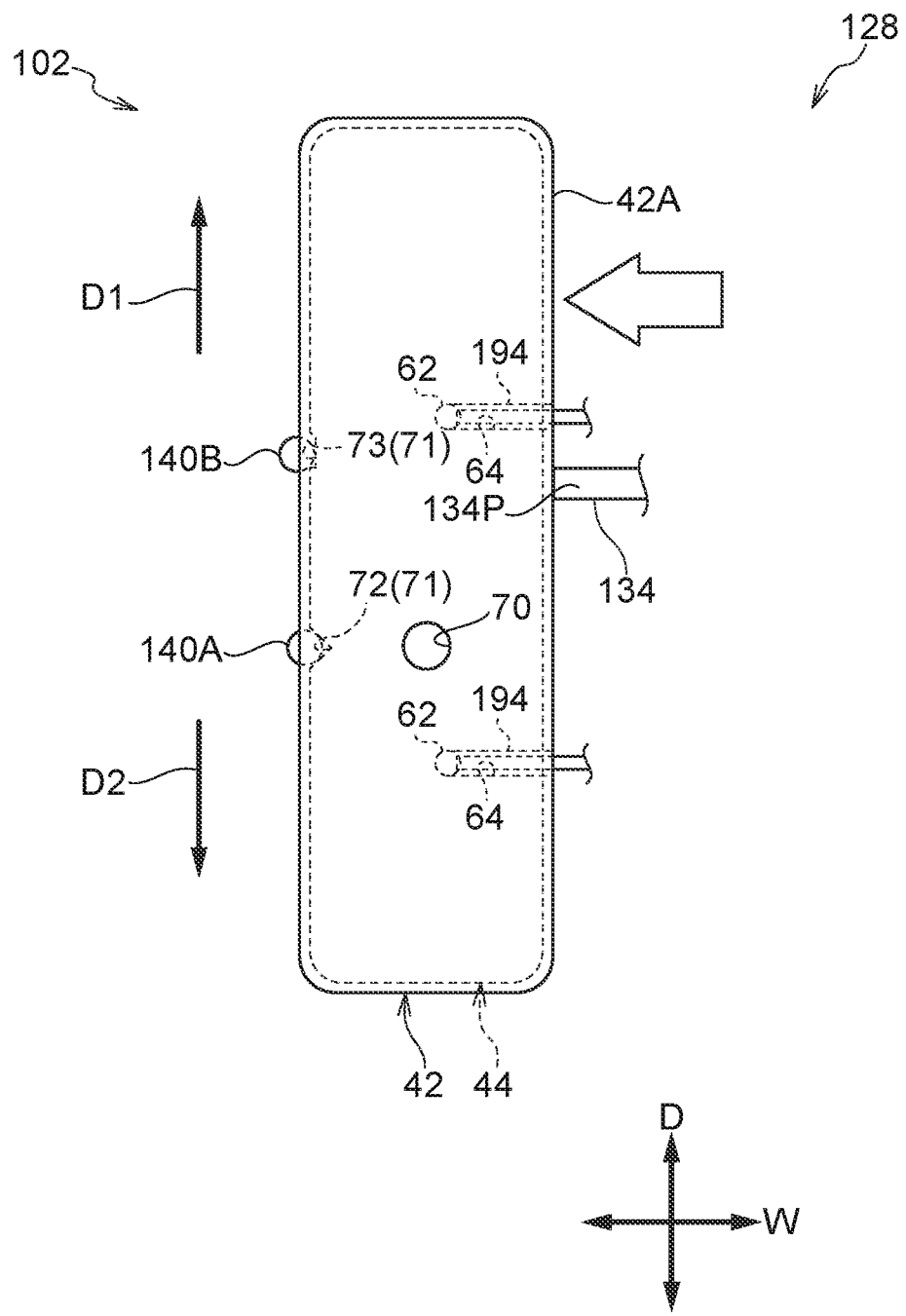
FIG. 21 is a plan view illustrating a state in which a power supply probe has been inserted into an analysis kit inside the analysis device of the first exemplary embodiment.

As illustrated in FIG. 21, one side face 46A of the cartridge 46 is formed with side-face holes 64 corresponding to the respective electrodes 62. The side-face holes 64 are holes that reach from one of two side faces of the analysis kit 42, such as the one side face 46A, to the corresponding electrode 62. As described later, a power supply probe 194, which is an example of a power supply member, of the analysis device 102 is inserted into each side-face hole 64 in the cartridge 46 and placed in contact with the electrode 62, enabling a voltage to be applied between the two electrodes 62.

Note that the one side face 46A and the other side face 46B of the cartridge 46 are the same faces as one side face 42A and the other side face 42B of the analysis kit 42.

In the first exemplary embodiment, the capillary 68 has a structure in which a groove formed in the lower plate 44B is covered by the upper plate 44A. Accordingly, in effect, the capillary 68 is formed in the lower plate 44B of the chip 44.

An insertion hole 70 is formed in the analysis kit 42 (the cartridge 46 and the chip 44) from an upper face side, at a location corresponding to an intermediate position of the capillary 68. In the first exemplary embodiment, part of the insertion hole 70 is also formed in the upper plate 44A of the chip 44.

As shown in FIG. 4, an illumination member 176 of the analysis device 102 is inserted into the insertion hole 70. The illumination member 176 is a member that illuminates a sample for electrophoresis in the capillary 68 with light from an illumination portion 176A at the tip of the illumination member 176. The illumination portion 176A of the illumination member 176 contacts a bottom 70B of the insertion hole 70.

As illustrated in FIG. 3, the chip 44 is formed with a notch 72 on the same side as the other side face 42B of the analysis kit 42. The notch 72 has an isosceles triangle shaped profile in plan view. The notch 72 is an example of a recess 71. The notch 72 includes two oblique faces 72A, 72B that are oblique with respect to a guide-in direction, as represented by arrow D1 direction toward the far side, of the analysis kit 42. A positioning pin 140A, described later, fits into the notch 72. The oblique faces 72A, 72B contact the positioning pin 140A.

The chip 44 is also formed with a notch 73, serving as a recess 71, at a separate position to that of the notch 72. Unlike the notch 72, the notch 73 has a substantially trapezoidal profile or rectangular profile in plan view. A positioning pin 140B, described later, fits into the notch 72. A back face 71D contacts the positioning pin 140B.

As an alternative configuration to that of the notch 72 and the notch 73 described above, three or more notches may be provided as recesses 71. Moreover, the profiles of the recesses 71 are not limited to the profiles of the notch 72 or notch 73. The profiles thereof are not limited as long as they contact or fit together with contact members such as positioning pins of the analysis device in a combination capable of positioning the analysis kit.

Note that the other side face 46B of the cartridge 46 is formed with an escape portion 46C to avoid contact with the positioning pins 140A, 140B. See FIG. 9.

In the analysis kit 42, the cartridge 46 is installed above the chip 44. In this state, claws 74 formed to the cartridge 46 engage with the chip 44, thereby integrating the chip 44 and the cartridge 46 into a single unit. In this integrated state, the cartridge 46 and the chip 44 can be fitted together by moving the chip 44 and the cartridge 46 relatively toward one another. When the chip 44 and the cartridge 46 are in both the integrated state and the fitted-together state, the external profile of the analysis kit 42 is a substantially rectangular block shape. The fitted-together state of the chip 44 and the cartridge 46 enables analysis of a component in the electrophoresing sample inside the capillary 68 to be performed.

An operation to fit the chip 44 and the cartridge 46 together may be performed by an analysis technician, or may be performed in the analysis device 102, as described later. In the fitted-together state, the bottom-face films 58 are pierced by the respective protrusions 50 located at positions corresponding to the bottom-face films 58. The protrusions 50 are an example of piercing projections that pierce the bottom-face films 58 configuring bottom faces of the liquid reservoirs 52. However, the piercing projection may have any profile as long as it is a profile capable of breaking the seal of the bottom-face film 58.

An example has been given in which the analysis kit 42 is configured by the chip 44 and the cartridge 46. However, any profile may be employed as long as it is a profile configured such that one side face is pushed in by a pusher member 128, described later, provided to the analysis device 102, and after being pushed in by the pusher member 128, the profile contacts a contact member at the other side face on the opposite side to the one side face. For example, there is no limitation to a rectangular block shape, and an oval column shape, or a circular column shape configured with a stepped profile on a given side face, may be employed. Likewise, although the configuration may include a capillary provided inside the analysis kit 42 into which the migration liquid and the sample are introduced with electrophoresis being induced in the sample, any configuration of analysis kit may be employed that includes a sample capable of being introduced into the analysis device 102 of the present application, positioned, and measured. For example, there is no limitation to an analysis kit employed with an electrophoresis method, and other examples of analysis kits include an analysis kit employed in an electrochemical measurement method, a colorimetric measurement method, an immunological measurement method, or the like. Application may be made to any analysis kit for which positioning of the analysis kit in a measurement apparatus is demanded.

Internal Configuration of the Analysis Device

As illustrated in FIG. 5 to FIG. 8, a guide-in section 120 is provided inside the casing 104 of the analysis device 102 shown in FIG. 1 at position where the tray 118 is loaded. The tray 118 retracts or moves toward the far side into the casing 104 such that an analysis kit 42 placed on the tray 118 is guided into the guide-in section 120. The guide-in section 120 is a location into which the analysis kit 42, provided with the electrodes 62 to induce electrophoresis in the sample in the capillary 68, is guided.

The guide-in section 120 includes a placement section 122, a pressing member 124 disposed above the placement section 122, and a measurement member 126. As described later, the measurement member 126 measures a component contained in the sample in the analysis kit 42 in a state in which the analysis kit 42 has been guided into the guide-in section 120. More specifically, in the first exemplary embodiment, the measurement member 126 measures a component contained in the sample using a light shone onto the sample flowing through the capillary 68 of the analysis kit 42. As an example, as illustrated in FIG. 4, the measurement member 126 includes an optical absorbance sensor 186 and a measurement section 190 that identifies the type and amount of a component present in the sample based on data from the optical absorbance sensor 186.

The placement section 122 includes a main portion 122A at a predetermined height as viewed along the depth direction, represented by the arrow D direction, of the analysis device 102, and a placement mount 122B that projects upward at a width direction central portion of the main portion 122A. The analysis kit 42 is placed on the placement mount 122B of the placement section 122. An upper face 42T and the channels 48 of the analysis kit 42 are horizontal in a state in which the analysis kit 42 has been placed on the placement mount 122B.

Figure 7:
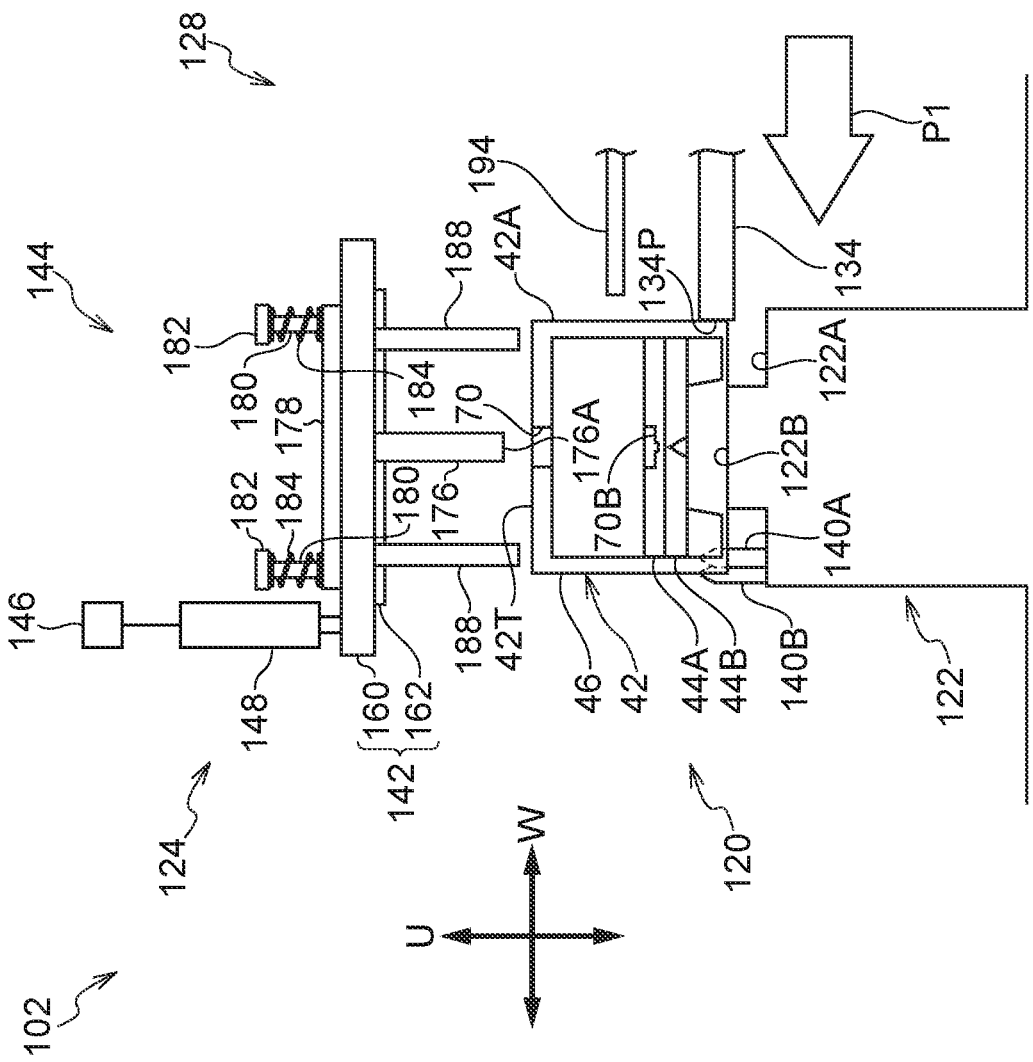
FIG. 7 is a front view illustrating a guide-in section and the vicinity thereof inside the analysis device of the first exemplary embodiment.

As illustrated in FIG. 5 and FIG. 7, the guide-in section 120 is provided with the pusher member 128.

A pusher rod 134 is retained in the pusher member 128 by a retention mechanism, not illustrated in the drawings. The pusher rod 134 is capable of approaching and retreating from the one side face 46A of the analysis kit 42. A leading end portion of the pusher rod 134 configures a pusher portion 134P that contacts and pushes the one side face 46A of the analysis kit 42 inward.

A pusher spring not illustrated in the drawings is installed to the pusher rod 134. A pusher motor not illustrated in the drawings pushes the pusher rod 134 in the arrow P1 direction through the pusher spring, and the pusher portion 134P at the leading end of the pusher rod 134 contacts the one side face 46A of the analysis kit 42. In this state, the pusher rod 134 continues moving in the direction toward the analysis kit 42, thus pushing the analysis kit 42 in the arrow P1 direction. Note that as described later, the chip 44 of the analysis kit 42 contacts the positioning pins 140A, 140B, and the pusher spring compresses in a state in which movement of the analysis kit 42 in the arrow P1 direction is obstructed. This suppresses the pusher rod 134 from being pushing the analysis kit 42 too far. The specific configuration of the pusher member is not limited to that described above, and any configuration may be employed as long as the configuration is capable of contacting the one side face 46A of the analysis kit 42 so as to push the analysis kit 42 in the arrow P1 direction.

One or plural positioning pins are provided for the analysis kit 42, so as to project upright at the side of the chip 44 formed with the notch 72 (the other side face 42B side), namely at the opposite side of the chip 44 to the pusher rod 134. For example, in the first exemplary embodiment, the two positioning pins 140A, 140B are provided with a gap between each other in the depth direction. The positioning pins 140A, 140B are examples of protrusions, and are also examples of contact members. Moreover, the pusher member 128 and the contact members, such as positioning pins 140A, 140B, configure together an example of a positioning member that positions the analysis kit 42 at a predetermined position.

Figure 9:
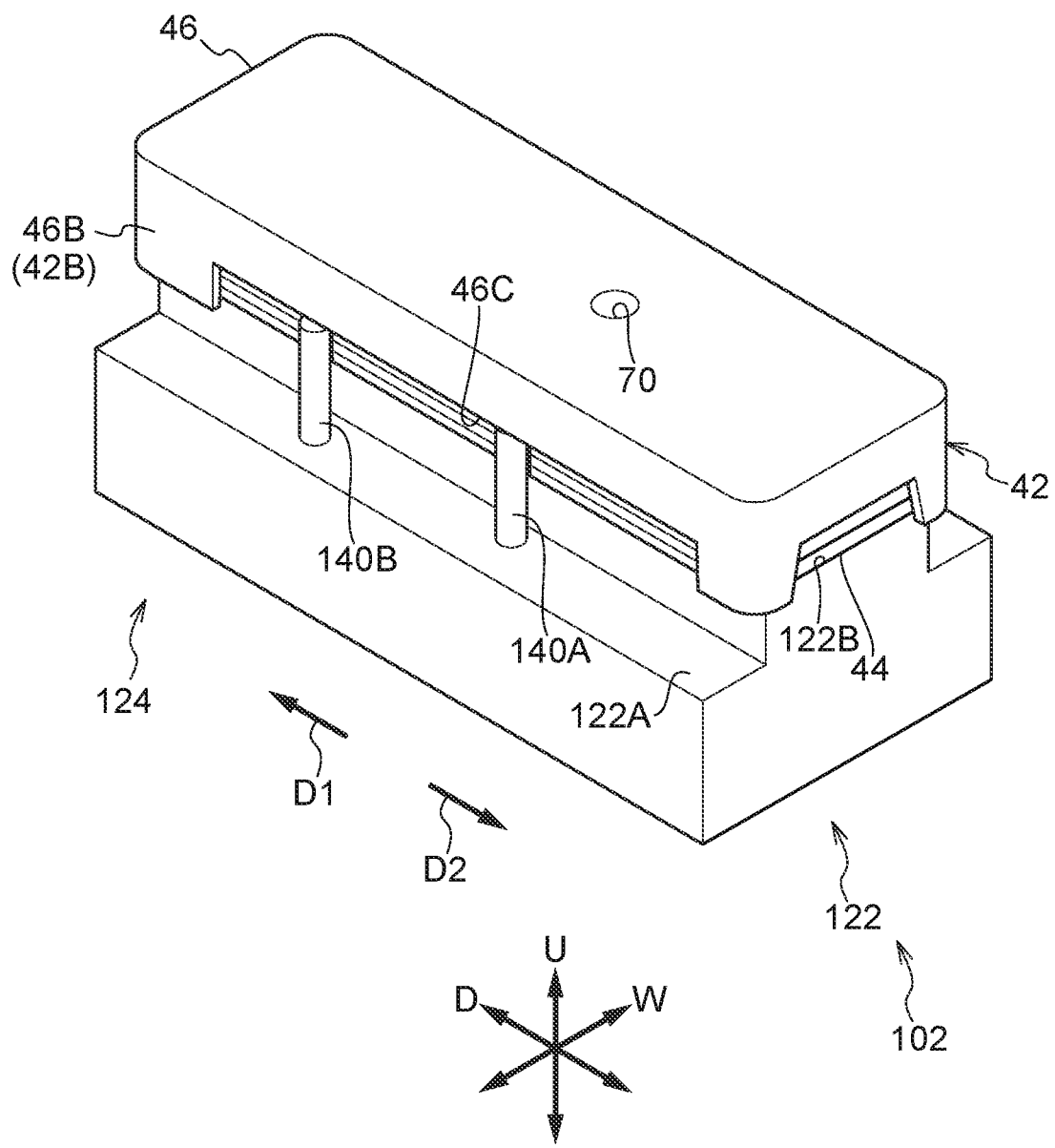
FIG. 9 is a perspective view illustrating a guide-in section and the vicinity thereof inside the analysis device of the first exemplary embodiment.

As illustrated in FIG. 9, both the positioning pins 140A, 140B are formed in circular column shapes with conical leading end portions or upper end portions. Moreover, the heights of the positioning pins 140A, 140B reach as high as the lower plate 44B of the analysis kit 42 when placed on the placement mount 122B, but do not reach as high as the upper plate 44A. The upper plate 44A is formed smaller than the lower plate 44B in the vicinity of the position of the positioning pins 140A, 140B, such that the positioning pins 140A, 140B would not contact the upper plate 44A even if they were to be formed higher due to dimensional tolerances.

The positioning pin 140A on the near side is located at a depth direction, represented by arrow D direction, position corresponding to where the notch 72 is formed on the chip 44. The positioning pin 140B on the far side is located at a depth direction, represented by arrow D direction, position where the recess 71 is formed, further toward the far side than the notch 72.

As illustrated in FIG. 6, the width direction, represented by arrow W direction, positions of the positioning pins 140A, 140B are positions that do not contact the analysis kit 42 in a state in which the analysis kit 42 has simply been guided into the guide-in section 120. However, when the analysis kit 42 is pushed in the arrow P1 direction by the pusher rod 134, the lower plate 44B of the chip 44 contacts the positioning pins 140A, 140B, thereby positioning the analysis kit 42 in the width direction.

Figure 8:
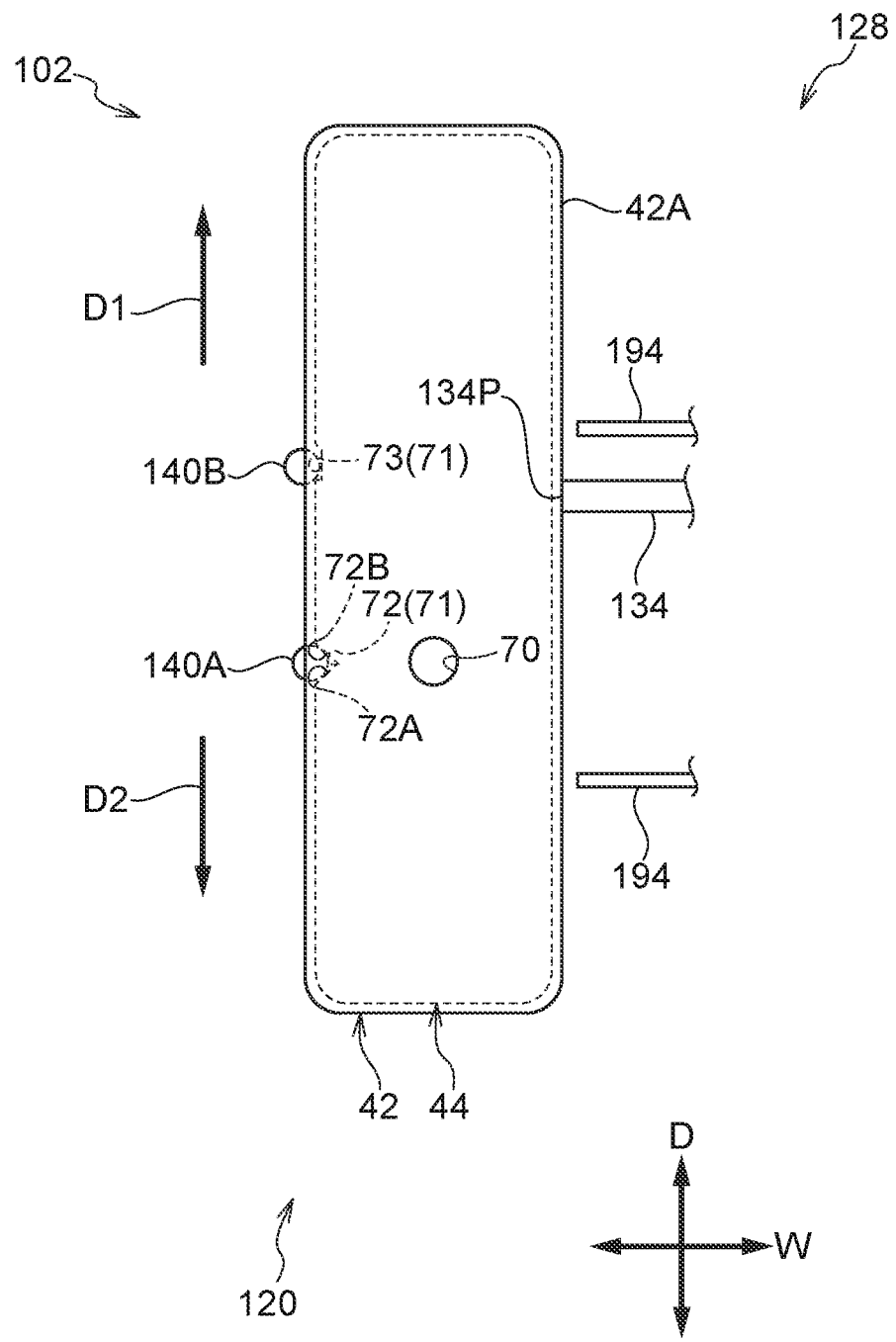
FIG. 8 is a plan view illustrating a guide-in section and the vicinity thereof inside the analysis device of the first exemplary embodiment.

Note that when either of the two oblique faces 72A, 72B of the notch 72 makes contact with the positioning pin 140A, the analysis kit 42 also moves in the depth direction. Thus, as illustrated in FIG. 8, both the oblique faces 72A, 72B are thereby positioned at positions contacting the positioning pin 140A.

The configuration of the contact members and protrusions is not limited to that described above, and any configuration may be employed in which contact is made with the side of the analysis kit 42 formed with the recesses 71, i.e. the other side face 42B side, when the analysis kit 42 is pushed and moved in the arrow P1 direction, so as to position the analysis kit 42 in the width direction. In particular, contact members and protrusions may be configured with any profile that corresponds to the profile of the analysis kit, and the contact members are preferably configured by protrusions. Configuring the contact members as protrusions enables a structure to be achieved in which the analysis kit reliably contacts the protruding portions or projecting portions. Contact members configured by protrusions are more preferably pins that project from the placement section on which the analysis kit is placed. The positioning pins 140A, 140B are an example of this configuration. The protrusions can be configured by a simple structure in a structure in which the protrusions are pins.

Figure 10:
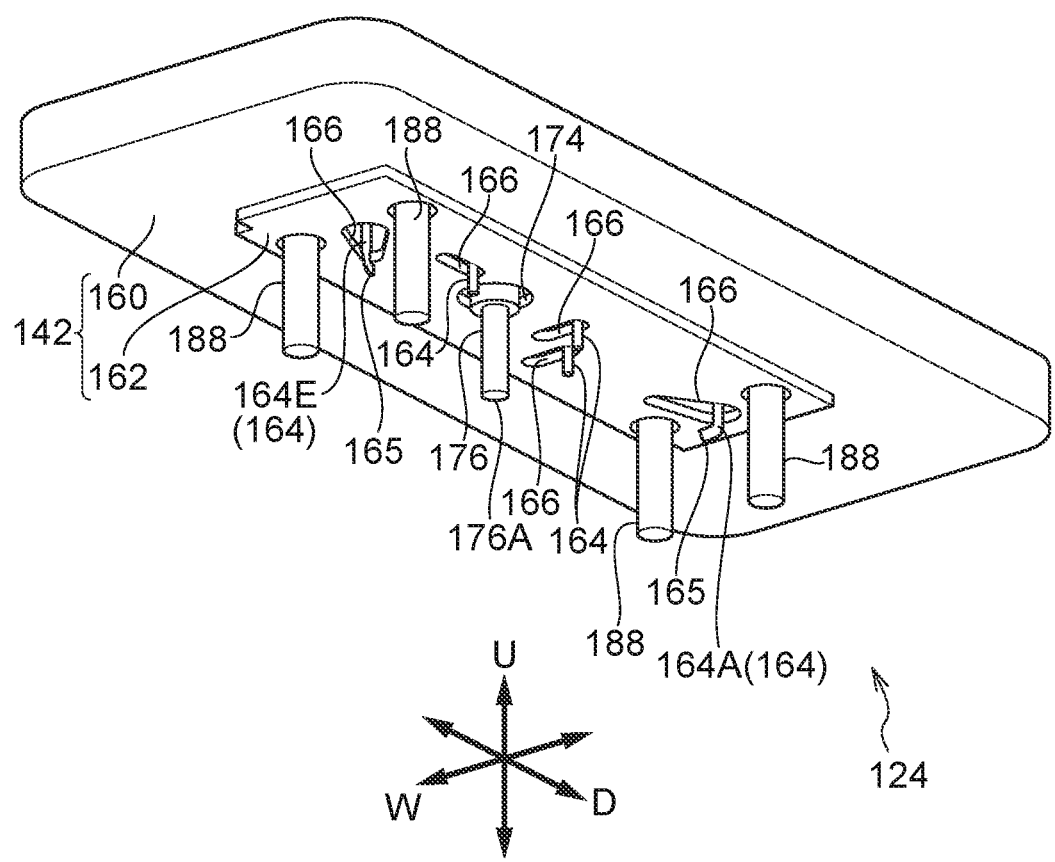
FIG. 10 is a perspective view illustrating a pressing member of the analysis device of the first exemplary embodiment.

As also illustrated in FIG. 10, the pressing member 124 is provided above the placement section 122. The pressing member 124 includes an opposing wall 142 that opposes the upper face of the analysis kit 42 when the analysis kit 42 has been guided into the guide-in section 120. The opposing wall 142 is moved vertically by a vertical drive mechanism 144.

In the first exemplary embodiment, the vertical drive mechanism 144 includes an elevator motor 148, driven under the control of a controller 146. Drive force of the elevator motor 148 acts on the opposing wall 142 through a spring, not illustrated in the drawings, so as to raise and lower the opposing wall 142.

Driving the elevator motor 148 lowers the opposing wall 142 via the spring, such that the opposing wall 142 contacts the upper face 42T of the analysis kit 42. This is a structure in which the non-illustrated spring would compress were driving of the elevator motor 148 to be continued after making contact, and the opposing wall 142 would not descend any further. A structure is thereby achieved in which the opposing wall 142 does not press the analysis kit 42 excessively.

The opposing wall 142 includes a wall body 160 that has a predetermined rigidity, and a close contact sheet 162 affixed to a lower face of the wall body 160. The close contact sheet 162 has a lower modulus of elasticity than both the wall body 160 and the cartridge 46 of the analysis kit 42, and therefore elastically deforms readily when applied with external force.

Figure 16:
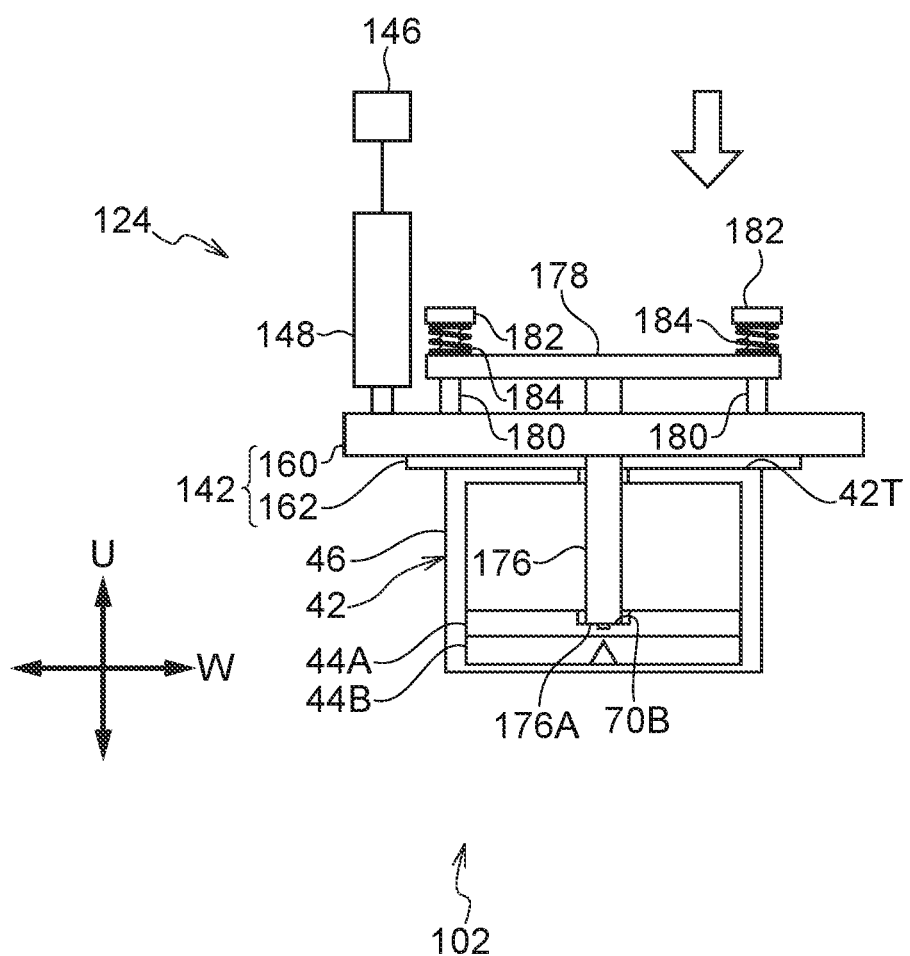
FIG. 16 is a front view illustrating a state in which a pressing member has pressed an analysis kit inside the analysis device of the first exemplary embodiment.

Namely, in a state in which the opposing wall 142 has been pushed in toward the analysis kit 42, the close contact sheet 162 is elastically compressed in its thickness direction (the vertical direction) to a greater degree than the wall body 160 and the cartridge 46. Accordingly, as illustrated in FIG. 16, when the opposing wall 142 descends, the close contact sheet 162 makes close contact with the upper face 42T of the analysis kit 42. The opposing wall 142 is also an example of a close contact portion.

In particular, the analysis kit 42 of the first exemplary embodiment includes the plural liquid reservoirs 52. The single close contact sheet 162 corresponding to the plural liquid reservoirs 52 makes close contact with the upper face 42T of the analysis kit 42. The analysis kit 42 can accordingly be pressed and gripped between the opposing wall 142 and the placement section 122 in the height direction of the analysis kit 42, namely the direction in which the chip 44 and the cartridge 46 are superimposed on each other.

The wall body 160 is provided with plural piercing pins 164, corresponding to each of the respective liquid reservoirs 52. The piercing pins 164 are an example of piercing members. Each of the piercing pins 164 projects downward further than the close contact sheet 162. The piercing pins 164 are capable of piercing the sealing film 54 at the corresponding liquid reservoirs 52 when the opposing wall 142 descends.

Figure 11:
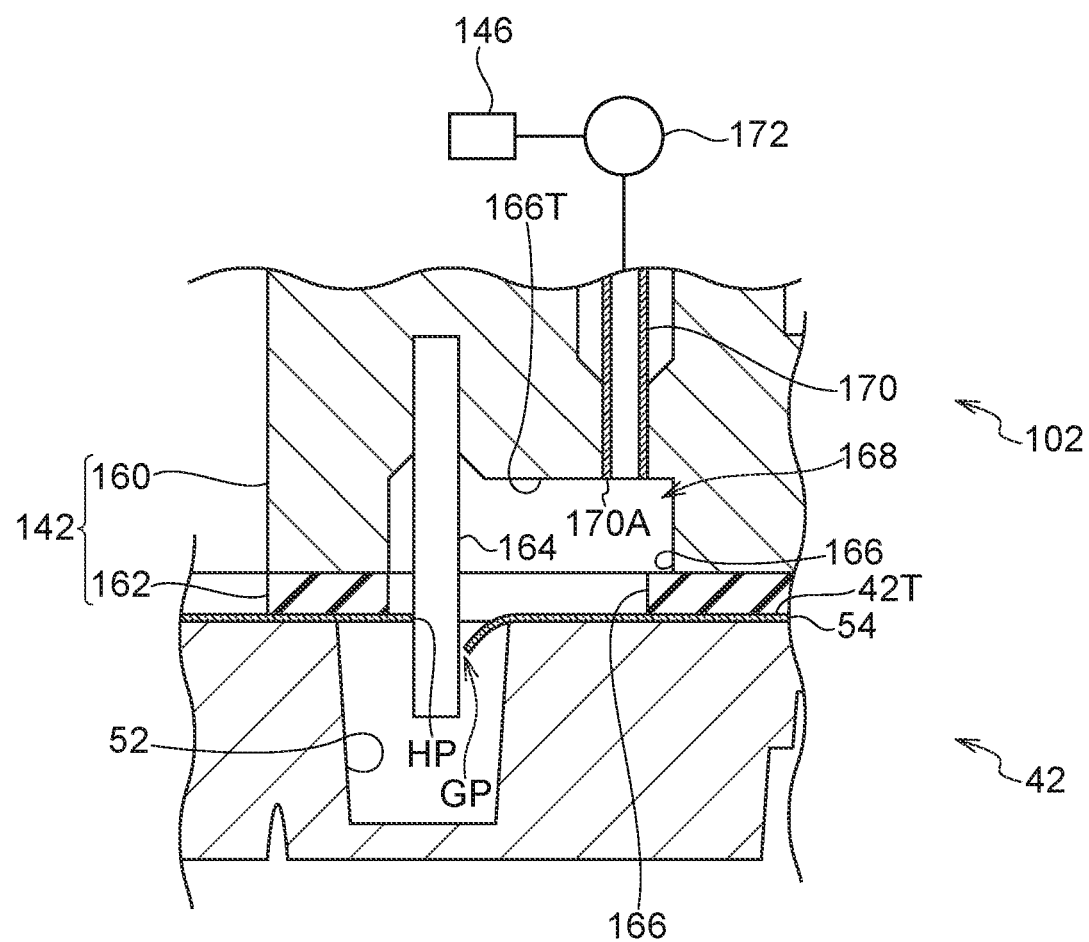
FIG. 11 is a cross-section illustrating a state in which a sealing film has been pierced by a piercing pin in the analysis device of the first exemplary embodiment.

As illustrated in FIG. 11, in a state in which the analysis kit 42 has been pressed by the pressing member 124 and the close contact sheet 162 has made close contact with the upper face 42T of the analysis kit 42, lower ends of the respective piercing pins 164 are positioned further toward the lower side than the sealing film 54, namely within the corresponding liquid reservoirs 52. Gaps GP are formed between holes HP formed by the piercing pins 164 and the piercing pins 164.

As illustrated in FIG. 10, for example, bent portions 165 are formed at the leading ends of piercing pins 164 corresponding to the liquid reservoirs 52 in which liquid has been encapsulated in advance out of the plural liquid reservoirs 52. For example, these are the piercing pins 164A, 164E in the example of FIG. 10; however, there is no limitation thereto. At the bent portions 165, the piercing pins 164 are bent in a direction intersecting the pressing direction of the pressing member 124, i.e. the downward direction. For example, the piercing pins 164 having the bent portions 165 are intersecting at approximately 90° in the example of FIG. 10. The piercing pins 164 formed with the bent portions 165 are able to pierce a larger hole in the sealing film 54 than piercing pins 164 not formed with the bent portions 165, resulting in a larger gap GP formed between the hole HP and the piercing pin 164.

Spacing recesses 166 indented toward the upper side are formed on the opposing wall 142 (the close contact sheet 162 and the wall body 160) with profiles that surround the piercing pins 164. Namely, the opposing wall 142, this being an example of a close contact portion, is formed with the spacing recesses 166. The spacing recesses 166 are portions where the opposing wall 142 is locally indented in a direction away from the liquid reservoirs 52 at the periphery of the piercing pins 164. Due to the presence of the spacing recesses 166, airtight spaces 168 are formed between the respective liquid reservoirs 52 and the opposing wall 142. This configuration, in which the spacing recesses 166 of the analysis device 102 and the upper face of the analysis kit 42 are utilized to form the airtight spaces 168 between the periphery of locations pierced by the piercing members and the analysis kit 42, results in an airtight member. Of course, the profile of the airtight spaces and method for forming the airtight spaces, as well as the profile of the airtight member, may be modified as appropriate in accordance with the profiles of the analysis device 102 and the analysis kit 42.

The opposing wall 142 is provided with gas introduction tubes 170, serving as an example of gas introduction members, corresponding to the respective spacing recesses 166. A lower end of each gas introduction tube 170 configures a gas port 170A through which a fluid enters and leaves the airtight spaces 168. In the first exemplary embodiment, the position of the lower end of each of the plural gas introduction tubes 170, namely the position of each of the gas ports 170A, is the same position as that of an upper face 166T of the corresponding spacing recess 166. A structure is thereby configured in which the gas port 170A of the gas introduction tube 170 is positioned at the airtight space 168 but does not project into the corresponding spacing recess 166.

The pump 172 is connected to the gas introduction tubes 170. Driving the pump 172 enables air to be fed into the airtight spaces 168, or to be sucked out of the airtight spaces 168. Note that a single pump 172 may be provided with a branching configuration so as to be common to the plural gas introduction tubes 170. In such cases, the structure may be configured with valves, not illustrated in the drawings, to switch the air flow path to a desired gas introduction tube 170.

As illustrated in FIG. 11, the gas introduction tubes 170 and the piercing pins 164 are offset from each other in the horizontal direction, which is at least one direction out of the depth direction or the width direction. Namely, the gas ports 170A of the gas introduction tubes 170 are at positions offset from the locations, i.e., the holes HP, in the film surface of the sealing film 54 pierced by the piercing pins 164.

The piercing pins 164 described above are one example of a piercing member. The piercing members may have any profile capable of piercing the sealing film 54 at the upper face of the liquid reservoirs 52 in the analysis kit 42. The gas introduction tubes 170 described above are one example of a gas introduction member, which may have any profile capable of introducing gas to the airtight spaces. Note that in the first exemplary embodiment, the piercing members are separate members to the gas introduction members. Both have profiles capable of suppressing liquid from the liquid reservoirs 52 from adhering to the gas introduction members through which gas enters the liquid reservoirs 52 of the analysis kit 42, and profiles capable of suppressing liquid from the liquid reservoirs 52 from flowing into the gas ports.

As illustrated in FIG. 10, the opposing wall 142 is formed with a through hole 174. An illumination member 176 is inserted through the through hole 174. Light emitted from a light emitting section, not illustrated in the drawings, is guided to the illumination member 176 through an optical fiber or the like. The illumination member 176 is a member that illuminates this light through an illumination portion 176A at a leading end thereof. In effect, the illumination member 176 may configure part of the optical fiber. Note that an LED chip that emits light in a predetermined wavelength region, an optical filter, a lens, and the like may be provided, and the light emitting section may have a profile provided with a slit or the like.

The illumination member 176 is inserted through the through hole 174, thereby suppressing horizontal direction misalignment of the illumination member 176 with respect to the opposing wall 142.

The position of the through hole 174 is a position corresponding to the insertion hole 70 in the analysis kit 42 when positioned at the predetermined position in the guide-in section 120. The external diameter of the illumination member 176 is smaller than the internal diameter of the through hole 174. This achieves a structure in which the illumination member 176 can be inserted into the insertion hole 70. A lower side portion of the illumination member 176 configures a projection 176T that projects to the lower side of the close contact sheet 162.

A limiting plate 178 that is broader than the through hole 174 is attached to an upper portion of the illumination member 176, namely on the opposite side of the illumination member 176 to the side projecting from the pressing member 124. The limiting plate 178 is an example of a limiting member that limits the projection amount of the projection 176T toward the analysis kit to within a specific range. The limiting plate 178 may have any profile as long as it has a limiting function. One or plural support columns 180 project upward from the opposing wall 142, the support columns 180 penetrating the limiting plate 178.

A leading end of each support column 180 is formed with an opposing plate 182 that is broader than the support column 180. The limiting plate 178 is positioned between the opposing wall 142 and the opposing plates 182. The limiting plate 178 is capable of moving vertically while being guided by the support columns 180, with the range of this vertical movement limited to between the opposing wall 142 and the opposing plate 182. This thereby enables a projection range of the projection 176T, being the projection length from the opposing wall 142, to be limited to within a predetermined range, thus enabling the projection 176T to be suppressed from projecting excessively from the opposing wall 142. The opposing wall 142 and the opposing plates 182 form a pair so as to oppose the limiting plate 178 from both sides in an approach/retreat direction of the projection 176T. Namely, the opposing wall 142 and the opposing plates 182 are an example of a pair of opposing members. The opposing wall 142 also doubles as a portion of an opposing member. Accordingly, the opposing wall 142 is configured from fewer components than in a structure in which an opposing member is configured by a separate member.

A spring 184 is interposed between the limiting plate 178 and each opposing plate 182. Biasing force of the springs 184 biases the illumination member 176 downward via the limiting plate 178. The springs 184 that apply this biasing force are an example of biasing members that bias the projection 176T in its direction of projection from the pressing member 124. Any profile that achieves such a biasing function may be adopted for the biasing member. Accordingly, the projection 176T of the illumination member 176 can be maintained in a state projecting by a predetermined projection amount from the opposing wall 142. The range of downward movement of the projection 176T is limited to a predetermined range due to the limiting plate 178 contacting the opposing wall 142, as illustrated in FIG. 14 and FIG. 15.

Figure 14:
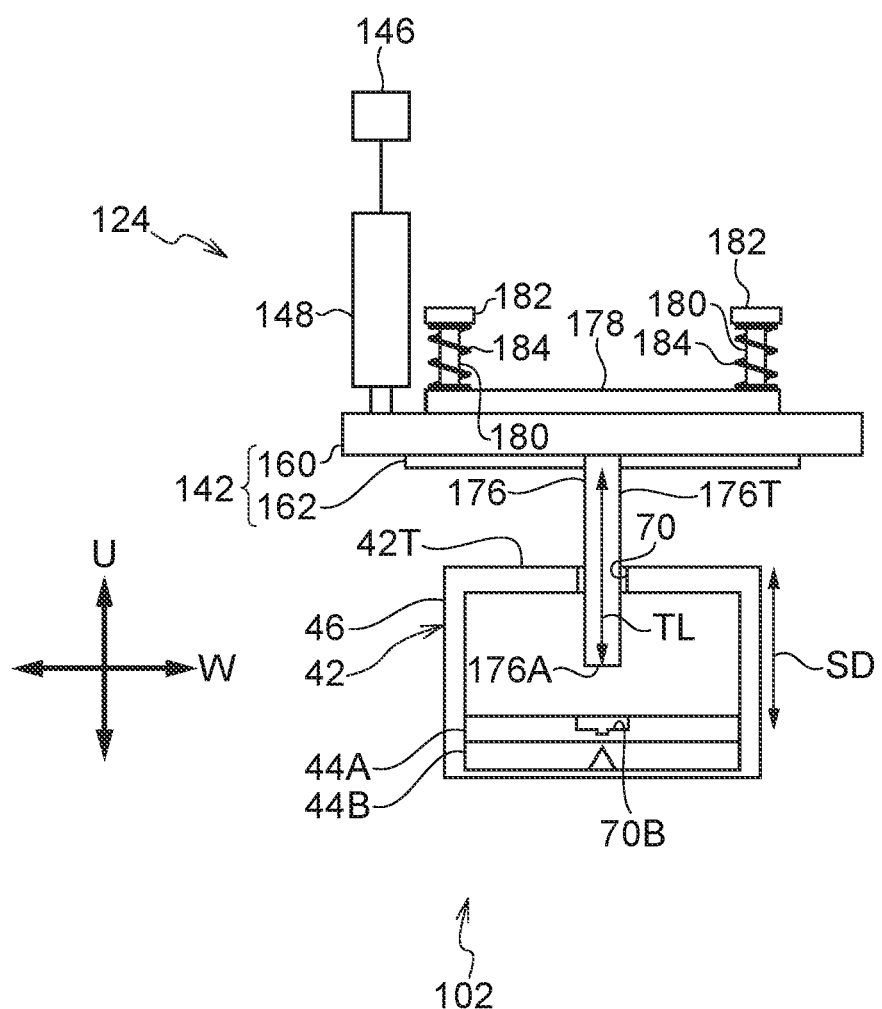
FIG. 14 is a front view illustrating a state in which an illumination member has been inserted into an analysis kit inside the analysis device of the first exemplary embodiment.
Figure 15:
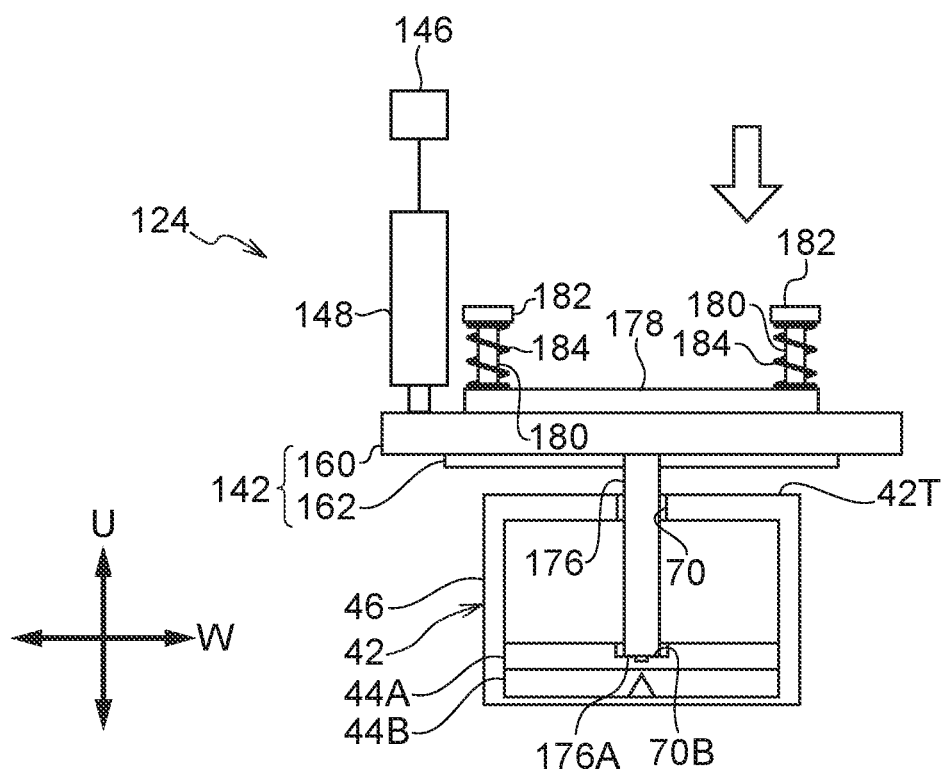
FIG. 15 is a front view illustrating a state in which an illumination member has been inserted into an analysis kit inside the analysis device of the first exemplary embodiment.

As illustrated in FIG. 14, in a state in which the limiting plate 178 is in contact with the opposing wall 142, a maximum value of a projection length TL of the projection 176T is longer than a depth SD of the insertion hole 70.

Accordingly, when the opposing wall 142 descends and the illumination member 176 is inserted into the insertion hole 70, the illumination portion 176A at the leading end of the illumination member 176 contacts the bottom 70B of the insertion hole 70. In this manner, the illumination member 176 and the limiting plate 178 descend while maintaining a constant positional relationship with the opposing wall 142 until the illumination portion 176A contacts the bottom 70B.

If the opposing wall 142 attempts to move further downward when in this state, due to the presence of a gap between the limiting plate 178 and the opposing plates 182, the illumination member 176 does not move downward even though the opposing wall 142 does move downward (while compressing the springs 184) so as to reduce this gap. See FIG. 16.

In the first exemplary embodiment, the direction in which the analysis kit 42 is pressed by the pressing member 124 (the direction in which the opposing wall 142 approaches the analysis kit 42), is the same direction as the direction in which the illumination member 176 approaches the analysis kit 42. A movement trajectory of the pressing member 124 partially coincides with a movement trajectory of the illumination member, enabling these members to be disposed within a smaller amount of space than in a structure in which these movement trajectories are entirely discrete from one another.

The optical absorbance sensor 186 is provided to the guide-in section 120 at a position below the insertion hole 70 when the analysis kit 42 has been set at the predetermined position. Light from the illumination member 176 is illuminated onto the electrophoresing sample in the capillary 68, and the measurement member 126 takes a measurement based on light transmitted through the sample. For example, the optical absorbance sensor 186 detects optical absorbance based on this transmitted light. As another example, a measurement member may be provided with a photodiode, a photo-IC, or the like.

Figure 12:
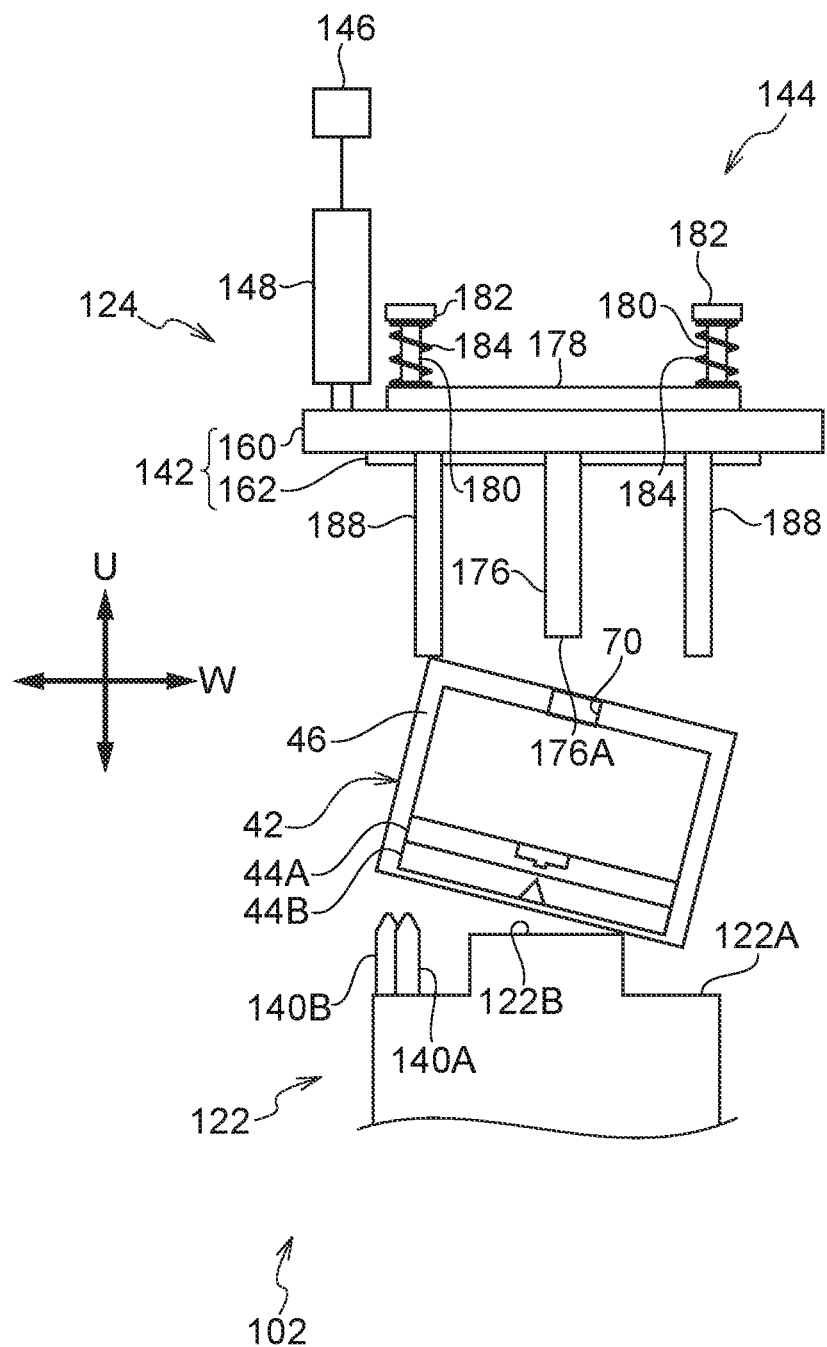
FIG. 12 is a front view illustrating a guide-in section and the vicinity thereof inside the analysis device of the first exemplary embodiment, and illustrating a state in which an analysis kit is tilted.
Figure 13:
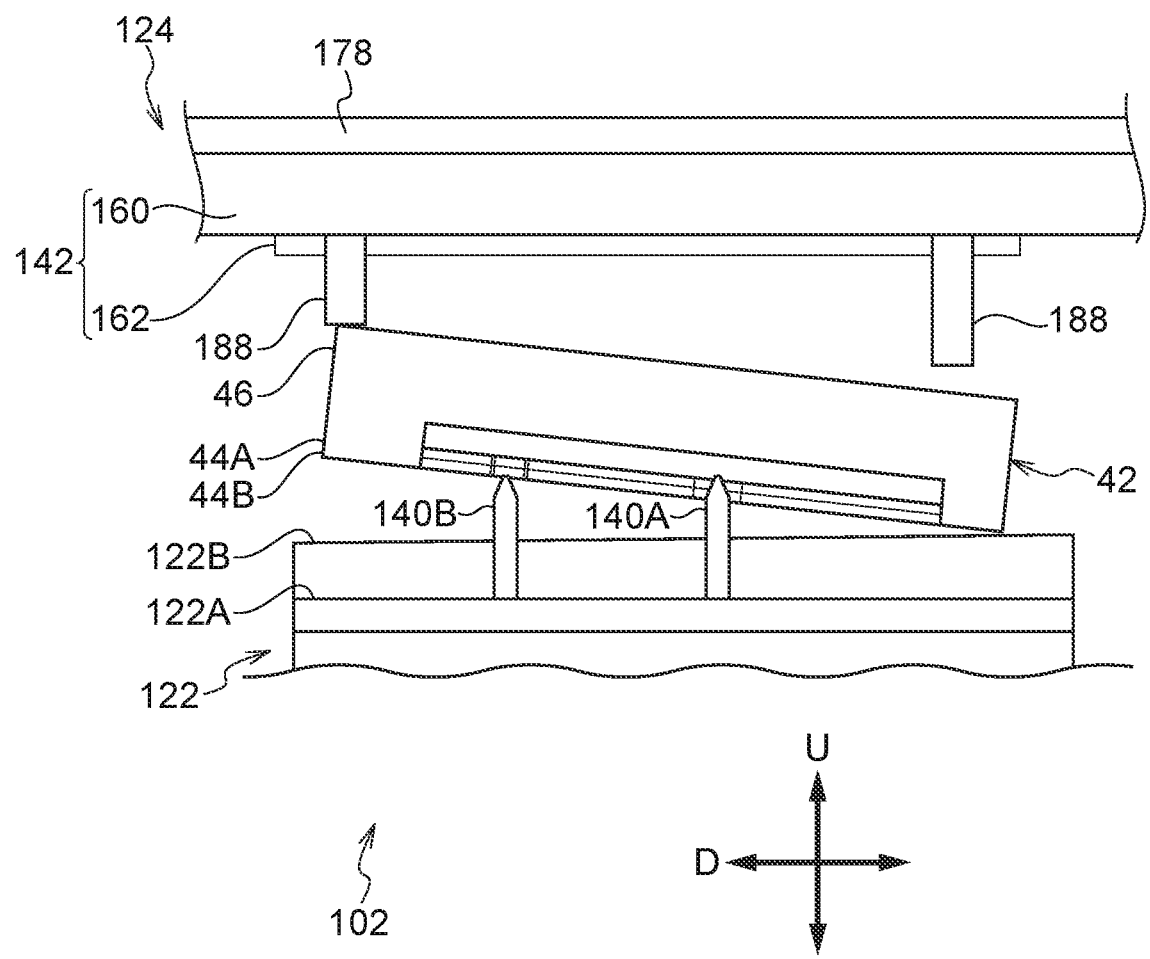
FIG. 13 is a side view illustrating a guide-in section and the vicinity thereof inside the analysis device of the first exemplary embodiment, and illustrating a state in which an analysis kit is tilted.

As illustrated in FIG. 10, plural tilt detection rods 188, serving as an example of a tilt detection section, are attached to the opposing wall 142. The tilt detection section is a member that detects tilt of the analysis kit 42 with respect to the horizontal direction, specifically, whether or not such tilt is present, when the analysis kit 42 has been guided into the guide-in section 120. Such tilt can be detected both in cases in which tilt is present in the width direction, as illustrated in FIG. 12, and in cases in which tilt is present in the depth direction, as illustrated in FIG. 13. Each of the tilt detection rods 188 is retained so as to be capable of moving vertically with respect to the opposing wall 142.

As illustrated in FIG. 5 and FIG. 7, the position of a lower end of each tilt detection rod 188 is a position that does not contact the analysis kit 42 in a state in which the analysis kit 42 has been introduced to the guide-in section 120 and is not tilted. However, as illustrated in FIG. 12 and FIG. 13, the positions of the lower ends of the tilt detection rods 188 are set to predetermined positions such that the lower ends of one or more of the tilt detection rods 188 contact the analysis kit 42 in cases in which the analysis kit 42 is tilted. When the opposing wall 142 descends further in a state in which a tilt detection rod 188 has contacted the analysis kit 42, the tilt detection rod 188 moves upward relative to the opposing wall 142. When the controller 146 detects such upward movement of the tilt detection rod 188, the controller 146 determines the analysis kit 42 to be tilted and is able to perform predetermined processing.

As illustrated in FIG. 5 to FIG. 8, the power supply probes 194 project into the guide-in section 120 at locations corresponding to the plural side-face holes 64 in the analysis kit 42. Each power supply probe 194 is driven by a motor, not illustrated in the drawings, controlled by the controller 146, so as to approach or retreat from the one side face 46A of the analysis kit 42.

The power supply probes 194 are an example of a power supply member. Each of the plural power supply probes 194 approaches the one side face 46A of the analysis kit 42 and is inserted into the corresponding side-face hole 64 so as to contact the respective electrode 62.

The respective power supply probes 194 are positioned on one side of the analysis kit 42 that has been retained at the predetermined position in the guide-in section 120, but are not present anywhere other than this side. Accordingly, a structure is achieved in which various members can be disposed at positions that avoid the power supply probes 194. For example, the pressing member 124 is disposed above the analysis kit 42, thereby suppressing interference between the pressing member 124 and the power supply probes 194. Moreover, the placement section 122 is disposed below the analysis kit 42, thereby suppressing interference between the power supply probes 194 and the placement section 122. Note that the profile of the power supply member is not particularly limited as long as power can be supplied to the electrodes 62.

Next, explanation follows regarding operation of the analysis device 102 of the first exemplary embodiment, and a method for analyzing a component contained in a sample in the analysis kit 42.

First, some of the channels 48 of the analysis kit 42 are filled with a sample, such as blood in the first exemplary embodiment.

A predetermined input operation is performed using the touch panel of the analysis device 102 so as to move the opening/closing cover 114 toward the near side and to expose the tray 118, as illustrated by the double-dotted dashed lines in FIG. 1.

In a state in which an analysis kit 42 containing a sample has been placed on the tray 118, the tray 118 and the opening/closing cover 114 are pushed (or a predetermined operation is performed using the non-illustrated touch panel of the analysis device 102) so as to move the tray 118 toward the far side. Accordingly, as illustrated in FIG. 5, the analysis kit 42 is guided into the guide-in section 120. The analysis kit 42 is placed on the placement mount 122B of the placement section 122.

The analysis device 102 includes the tilt detection section. In this state, the analysis device 102 detects any tilt of the analysis kit 42 using the tilt detection section. Specifically, the controller 146 drives the elevator motor 148 to cause the opposing wall 142 of the pressing member 124 to descend to a predetermined position.

When this is performed, in cases in which the analysis kit 42 is tilted as illustrated in FIG. 12 or FIG. 13, one or more of the plural tilt detection rods 188 contact the analysis kit 42. In such cases, the controller 146 halts driving of the elevator motor 148, and performs predetermined processing in response to the fact that the analysis kit 42 is tilted. The "predetermined processing" referred to here includes, for example, processing to temporarily halt component analysis from being performed on the sample, and to notify a technician that the analysis kit 42 is tilted.

Providing the plural tilt detection rods 188 enables the tilt detection precision to be suppressed from deteriorating according to the tilt direction or the tilt amount (tilt angle) of the analysis kit 42.

The structure of the tilt detection section used to detect tilt of the analysis kit 42 is not limited to that described above. For example, a structure may be employed in which light is illuminated onto the analysis kit 42 from plural locations in order to detect tilt.

In cases in which the analysis kit 42 is not tilted, including cases in which any tilt is within a permissible range, the controller 146 performs positioning of the analysis kit 42 by executing positioning in a positioning direction. Note that the state when positioning is performed is, as illustrated in FIG. 6, a state in which the notch 72 of the analysis kit 42 and the positioning pin 140A are not in contact with each other, and the recess 71 and the positioning pin 140B are not in contact with each other.

The controller 146 drives the pusher motor, not illustrated in the drawings, such that the pusher rod 134 pushes the one side face 46A of the analysis kit 42. Accordingly, as illustrated in FIG. 7 and FIG. 8, the chip 44 of the analysis kit 42 contacts the positioning pins 140A, 140B. This thereby positions the analysis kit 42 at the predetermined position.

In particular, in the first exemplary embodiment, the height of the positioning pin 140A reaches the height of the lower plate 44B of the chip 44, but does not reach the height of the upper plate 44A. The lower plate 44B of the chip 44 contacts the positioning pins 140A, 140B, thereby positioning the analysis kit 42. Due to the capillary 68 being formed in the lower plate 44B of the chip 44, this in effect enables accurate positioning of the capillary 68.

The chip 44 is formed with the notch 72. When the analysis kit 42 approaches the positioning pin 140A, either the oblique face 72A or the oblique face 72B contacts the positioning pin 140A, and as the analysis kit 42 is pushed further in, the analysis kit 42 is also moved in the depth direction. As illustrated in FIG. 8, the analysis kit 42 is thus positioned at a position where both the oblique face 72A and the oblique face 72B contact the positioning pin 140A. Namely, the analysis kit 42 is positioned not only in the width direction but also in the depth direction, which is the direction of guiding into the guide-in section 120.

In this state, the positioning pin 140A fits together with the notch 72, and the positioning pin 140B fits together with the notch 73, thereby suppressing positional misalignment in the depth direction when the analysis kit 42 is in a positioned state.

Next, the controller 146 drives the elevator motor 148 to cause the opposing wall 142 to descend. Accordingly, as illustrated in FIG. 14, the illumination member 176 also descends so as to approach the analysis kit 42. The analysis kit 42 has already been positioned at the predetermined position, thereby positioning the insertion hole 70. The illumination member 176 is thus inserted into the insertion hole 70 without contacting the upper face 42T of the analysis kit 42.

Then, as illustrated in FIG. 15, the illumination portion 176A at the lower end of the illumination member 176 contacts the bottom 70B of the insertion hole 70. Even if the elevator motor 148 continues to be driven in this state, as illustrated in FIG. 16, the illumination member 176 and the limiting plate 178 do not descend any further, thereby enabling the illumination portion 176A of the illumination member 176 to be suppressed from sustaining damage as a result of being pushed hard against the bottom 70B.

When the opposing wall 142 descends, the plural piercing pins 164 pierce the sealing film 54 at the corresponding liquid reservoirs 52. The close contact sheet 162 then makes close contact with the upper face 42T of the analysis kit 42.

In this state, as illustrated in FIG. 11, the airtight spaces 168 are formed at each of the plural liquid reservoirs 52 between the periphery of the locations pierced by the piercing pins 164 and the analysis kit 42. The close contact sheet 162 makes close contact in a state of face-against-face contact with the upper face 42T of the analysis kit 42, thereby enabling the airtight state of the airtight spaces 168 to be more reliably maintained than, for example, in a structure in which a close contact member makes line contact therewith.

Figure 17:
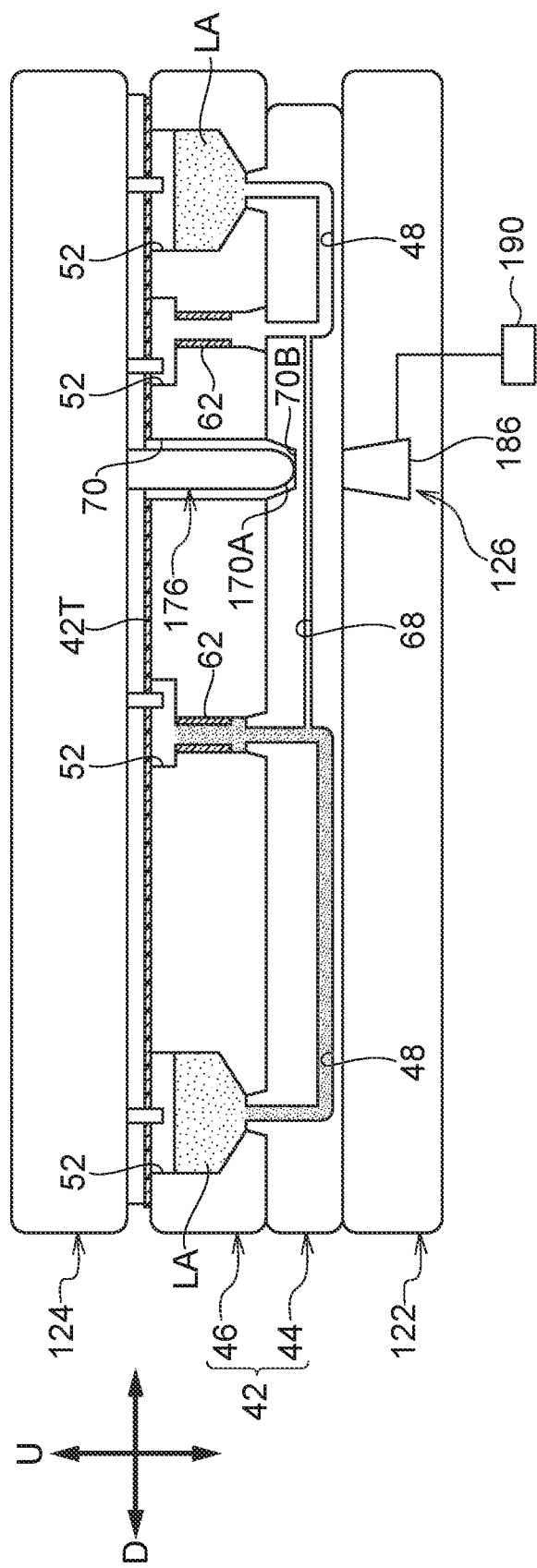
FIG. 17 is a diagram illustrating an analysis kit in a state partway through analysis of a sample by an analysis device.

Moreover, in this state, the analysis kit 42 is sandwiched from above and below between the pressing member 124 and the placement section 122 on which the analysis kit 42 has been placed, such that the cartridge 46 and the chip 44 are fitted together. Moreover, as illustrated in FIG. 17, since the bottom-face films 58 corresponding to the respective protrusions 50 are pierced, liquid is capable of flowing out downward from the liquid reservoirs 52 where the bottom-face film 58 has been pierced. Note that the cartridge 46 and the chip 44 make close contact in the vertical direction, thereby suppressing the formation of gaps between the cartridge 46 and the chip 44 where liquid would leak out from the liquid reservoirs 52 where the bottom-face film 58 has been pierced.

The analysis kit 42 is pressed by the pressing member 124 and retained between the placement section 122 and the pressing member 124, thereby suppressing positional misalignment of the analysis kit 42. In the first exemplary embodiment, since the analysis kit 42 is positioned by positioning members, the analysis kit 42 can be retained in a positioned state by pressing the analysis kit 42 with the pressing member 124.

Moreover, even in a structure in which a large amount of force is required to fit the cartridge 46 and the chip 44 together, the cartridge 46 and the chip 44 can be reliably fitted together since the analysis kit 42 is sandwiched and pressed between the placement section 122 and the pressing member 124. Moreover, the analysis kit 42 can be pressed by the pressing member 124 while maintaining an inserted state of the illumination member 176 into the insertion hole 70.

Note that the controller 146 drives the pump 172, such that gas is supplied into or sucked out from a specific liquid reservoir 52 at a predetermined timing. See FIG. 11. The gaps GP are formed between the piercing pins 164 and the sealing film 54 at the locations pierced by the piercing pins 164, permitting the movement of air passing through the gaps GP between the airtight spaces 168 and the corresponding liquid reservoirs 52.

As an example, first, as illustrated in FIG. 17, air is introduced or forced into one of the liquid reservoirs 52, such as the liquid reservoir 52 on the left side in FIG. 17. The sample is thereby diluted and agitated by the liquid LA, and fed to another liquid reservoir 52 through a specific channel 48.

Figure 18:
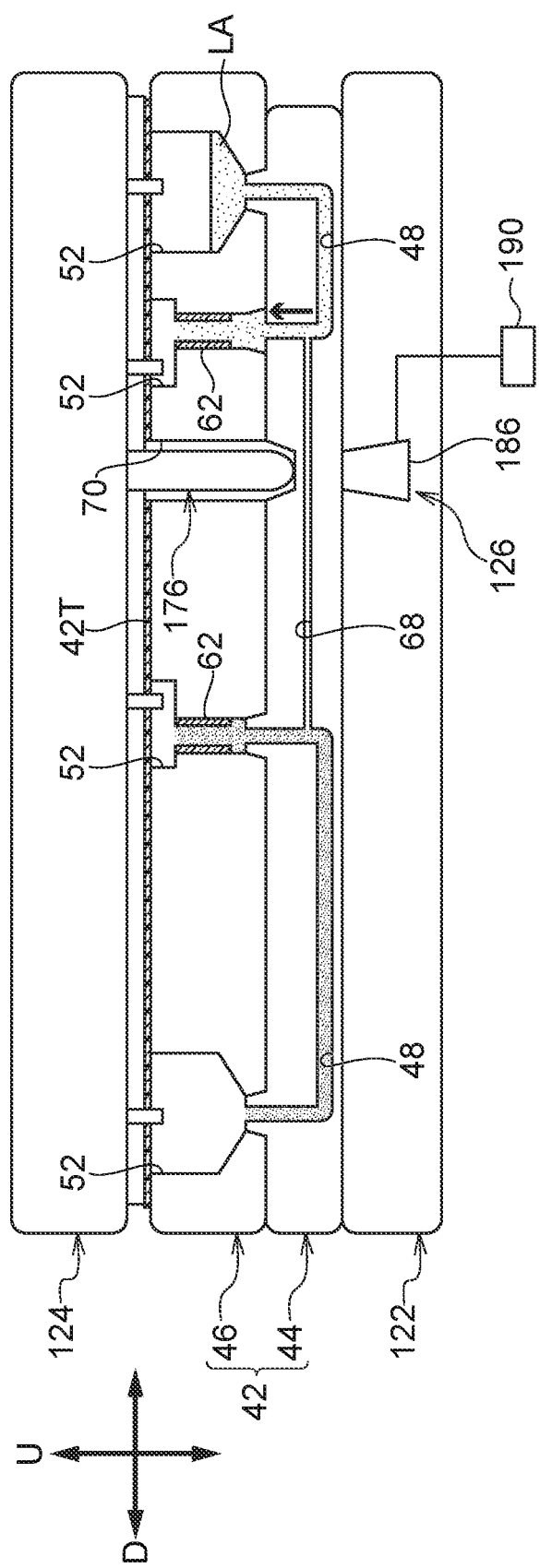
FIG. 18 is a diagram illustrating an analysis kit in a state partway through analysis of a sample by an analysis device.
Figure 19:
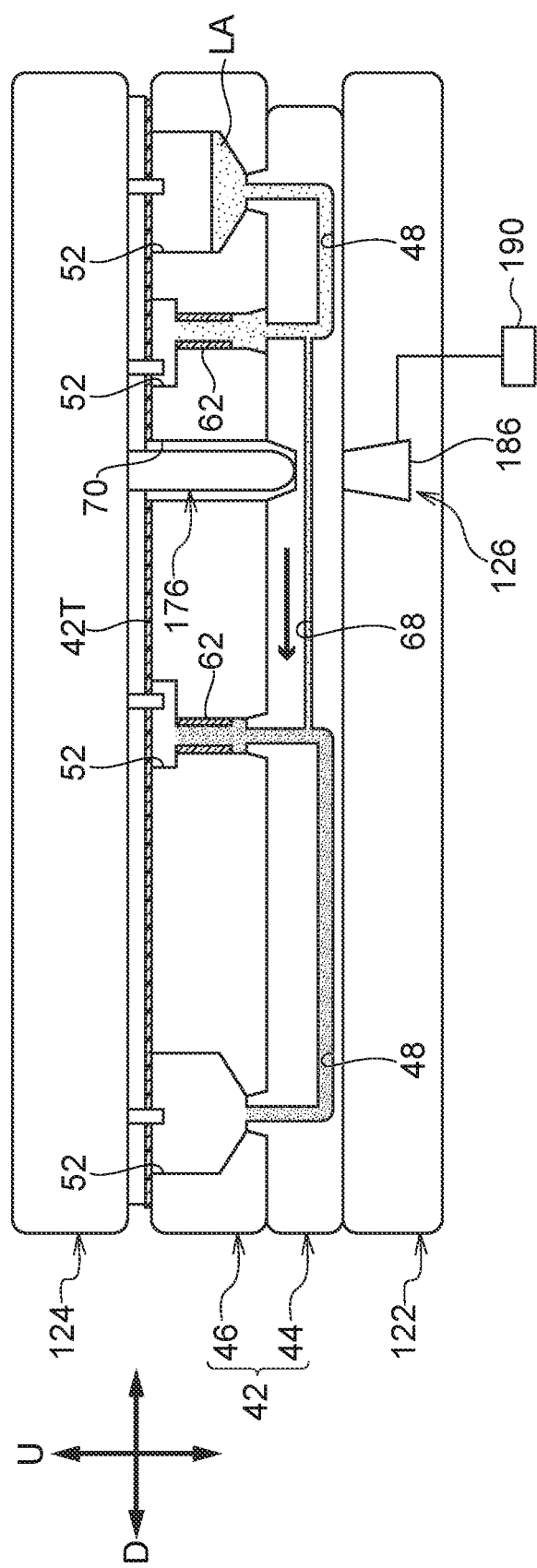
FIG. 19 is a diagram illustrating an analysis kit in a state partway through analysis of a sample by an analysis device.

Then, as illustrated in FIG. 18, air is, for example, introduced or forced into a different liquid reservoir 52, such as the liquid reservoir 52 on the right side in FIG. 18. The liquid LA in this liquid reservoir 52 thus fills the channel 48 connected to this liquid reservoir 52. Then, as illustrated in FIG. 19, the liquid fills the capillary 68 as a result of capillary action.

The piercing pins 164 that pierce the sealing film 54 are separate members to the gas introduction tubes 170 that introduce gas or fluid to the airtight spaces 168. Moreover, the gas ports 170A at the lower ends of the gas introduction tubes 170 are positioned within the corresponding airtight spaces 168. Accordingly, the liquid in the liquid reservoirs 52 is suppressed from entering the interior of the gas introduction tubes 170. For example, diluted sample from a previous sample analysis is suppressed from remaining inside the gas introduction tubes 170, thereby suppressing a situation from arising in which such remaining diluted sample mixes with a diluted sample from the current analysis.

Moreover, in the first exemplary embodiment, the gas ports 170A are positioned offset from the locations of the film surface of the sealing film 54 that are pierced by the piercing pins 164. Accordingly, the liquid in the liquid reservoirs 52 can be suppressed from flowing into the gas ports 170A even if the liquid were to pass through the gap between a piercing pin 164 and the sealing film 54 and enter the airtight space 168.

Moreover, since the gas ports 170A are separated from the pierced locations, even were a fragment of a member configuring the sealing film 54 to break off when the sealing film 54 is pierced by the piercing pins 164, such a fragment can be suppressed from entering a gas port 170A.

Figure 20:
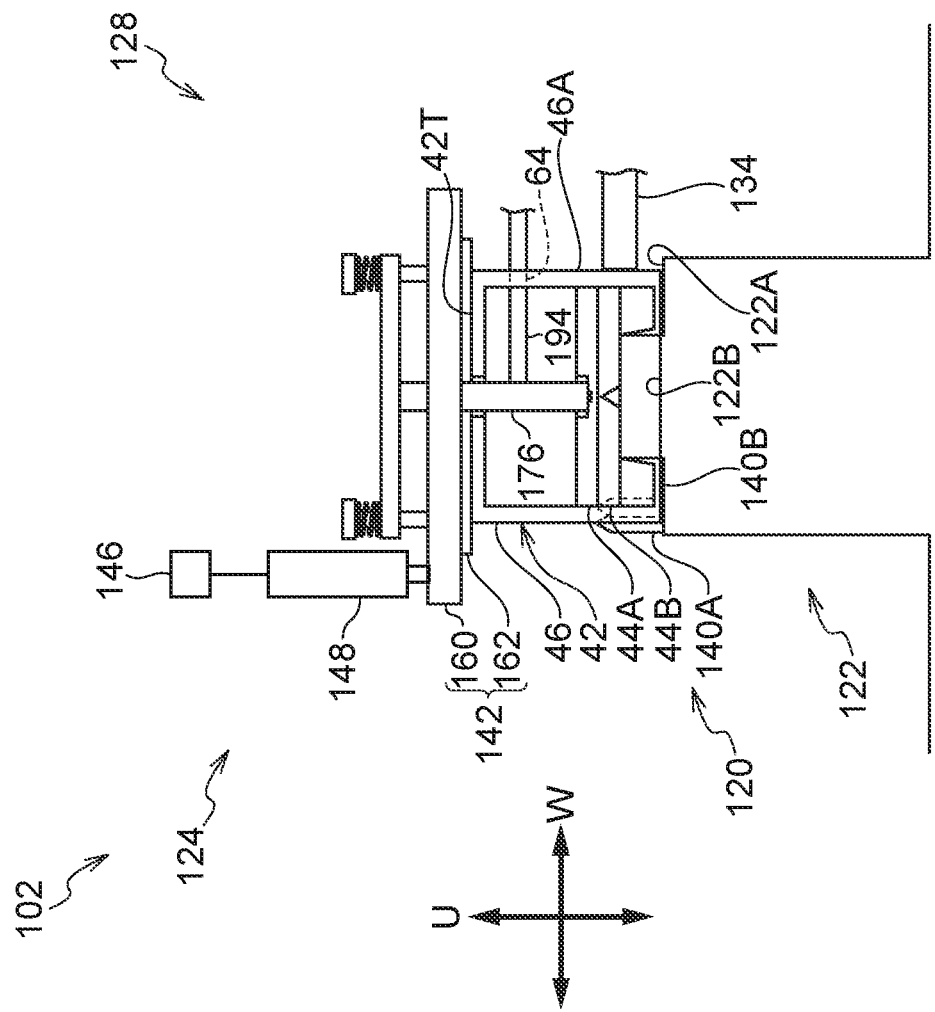
FIG. 20 is a front view illustrating a state in which a power supply probe has been inserted into an analysis kit inside the analysis device of the first exemplary embodiment.

Next, the controller 146 drives the pusher motor, not illustrated in the drawings, such that the power supply probes 194 approach the one side face 46A of the analysis kit 42, as illustrated in FIG. 20 and FIG. 21. The power supply probes 194 are inserted into the corresponding side-face holes 64, and contact the electrodes 62. At this stage, the analysis kit 42 has already been positioned in the depth direction. Namely, the analysis kit 42 has already been positioned in a direction intersecting the direction in which the power supply probes 194 approach the analysis kit 42, a direction orthogonal thereto in the example of FIG. 21. Accordingly, the leading ends of the power supply probes 194 are reliably inserted into the side-face holes 64, without touching the one side face 46A of the analysis kit 42.

Figure 22:
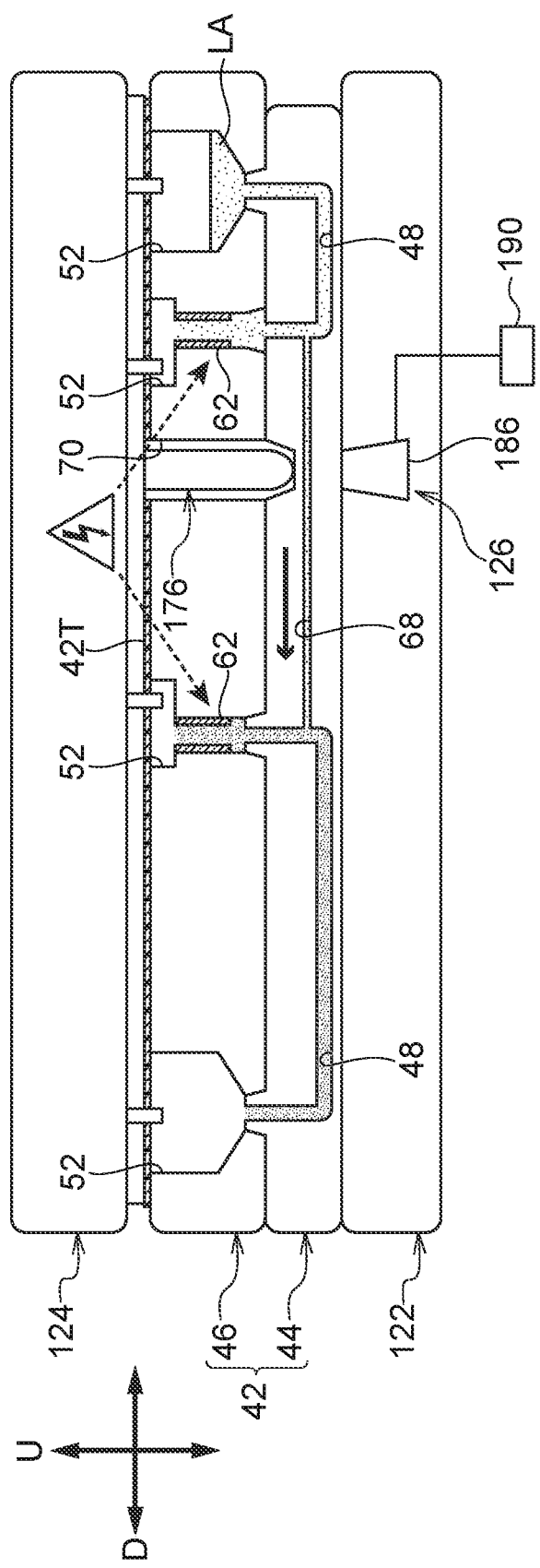
FIG. 22 is a diagram illustrating an analysis kit in a state partway through analysis of a sample by an analysis device.

In this state, the controller 146 applies a predetermined voltage between the electrodes 62 via the power supply probes 194, as illustrated in FIG. 22. This induces electrophoresis in the component present in the sample in the capillary 68. Moreover, when this is performed, the controller 146 causes light to be illuminated from the illumination portion 176A of the illumination member 176. The optical absorbance of the electrophoresing diluted sample is detected by the optical absorbance sensor 186 in order to measure the component present in the sample.

The illumination portion 176A of the illumination member 176 is in contact with the bottom 70B of the insertion hole 70 when this is being performed. Namely, the illumination portion 176A is at a position a short distance from the capillary 68, and this distance is kept constant. This thereby enables light to be illuminated onto the electrophoresing sample within the capillary 68 in a stable manner.

Moreover, since the analysis kit 42 is sandwiched between the opposing wall 142 of the pressing member 124 and the placement section 122 so as to be retained at the predetermined position, the position of the analysis kit 42 is stable. Since the capillary 68 is formed in the chip 44 of the analysis kit 42, the position of the capillary 68 is also stable. This thereby enables analysis of the component present in the sample to be performed more accurately.

After completion of analysis of the component present in the sample, the controller 146 withdraws the power supply probes 194 from the side-face holes 64, and raises the opposing wall 142, such that the analysis device 102 is no longer pressed, and moreover the illumination member 176 is removed from the insertion hole 70. Moreover, the pusher rod 134 is retracted and separated from the analysis device 102.

The opening/closing cover 114 and the tray 118 are then moved toward the near side, permitting removal of the analysis kit 42. The analysis kit 42 is disposable once analysis has been completed.

In the first exemplary embodiment, the analysis kit 42 is packaged with the measurement target sample and the liquids necessary for measurement, such as a diluent LA and a migration liquid LA, are housed therein. There is therefore no need to set up the analysis device 102 in advance with liquids required for measurement, and there is no need for a storage section to temporarily store such liquids, nor for a pump or the like to feed these liquids to the measurement site. This thereby enables the analysis device 102 to be simplified in structure and made more compact.

In the above explanation, the rod-shaped positioning pins 140A, 140B are given as an example of contact members; however, there is no limitation to such rod-shaped pins. For example, contact members may be configured by plate shaped members. Employing rod-shaped pins as the contact members enables the contact members to be disposed in a smaller space than would be possible in the case of plate shaped members. Providing plural of the rod-shaped pins enables the analysis kit 42 contacted by the pins to be better suppressed from rotating than in a configuration in which only a single rod-shaped pin is provided, thereby enabling stable positioning.

Second to Fourth Exemplary Embodiments, Reference Example

Explanation follows regarding a second to a fourth exemplary embodiment, and a reference example. In the following exemplary embodiments and in the reference example, the overall configuration of the analysis device is similar to that of the first exemplary embodiment, and detailed explanation thereof is therefore omitted. Elements, members, and so on similar to those of the first exemplary embodiment are allocated the same reference numerals, and detailed explanation thereof is omitted.

Figure 23:
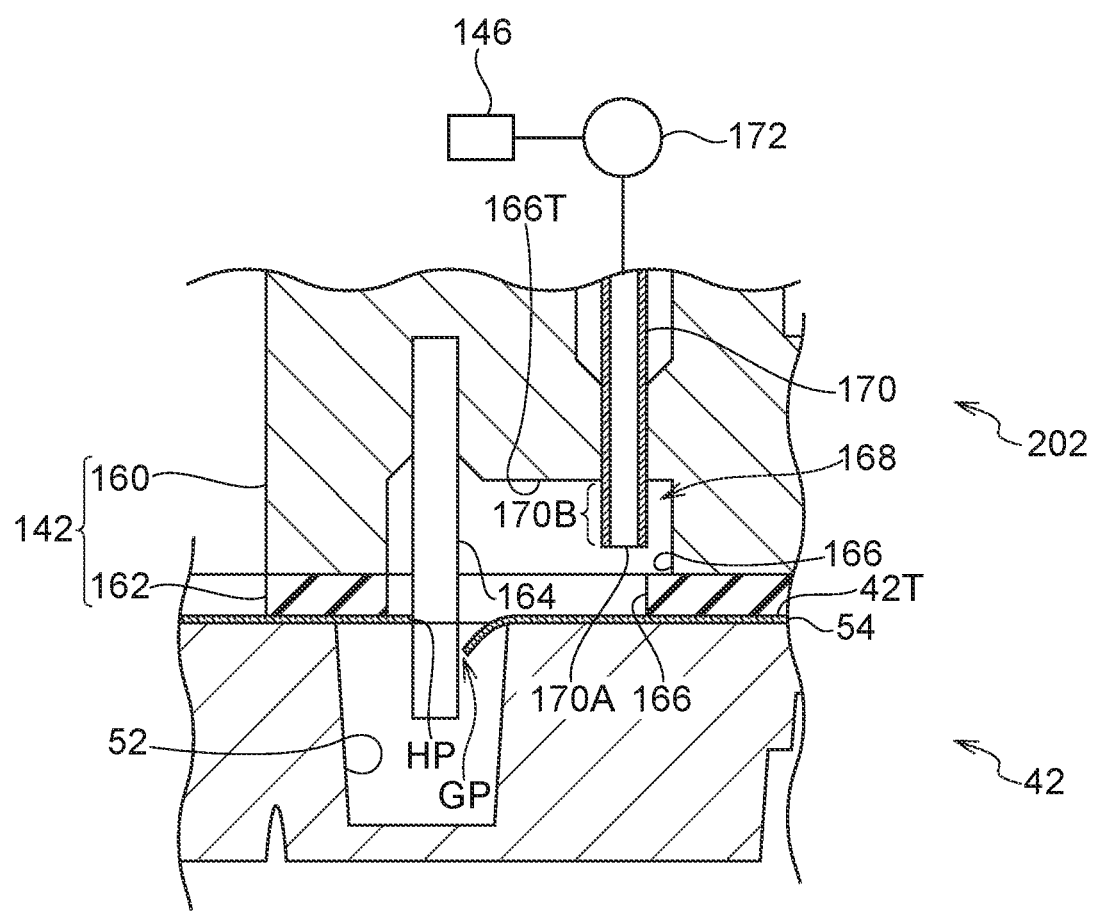
FIG. 23 is a cross-section illustrating a state in which a sealing film has been pierced by a piercing pin in an analysis device of a second exemplary embodiment.

In an analysis device 202 of a second exemplary embodiment, illustrated in FIG. 23, the lower end portions of the gas introduction tubes 170 are configured by projections 170B projecting further downward than upper faces 166T of spacing recesses 166. The lower end portions of the gas introduction tubes 170 also configure leading end portions thereof that contain the gas ports 170A.

In the second exemplary embodiment, the lower end portion of each gas introduction tube 170 projects out. Accordingly, even were liquid that had flowed into an airtight space 168 to move toward the gas introduction tube 170 along the upper face 166T, the liquid would be blocked by the gas introduction tube 170 itself, thereby enabling the liquid to be suppressed from flowing into the gas port 170A.

Figure 24:
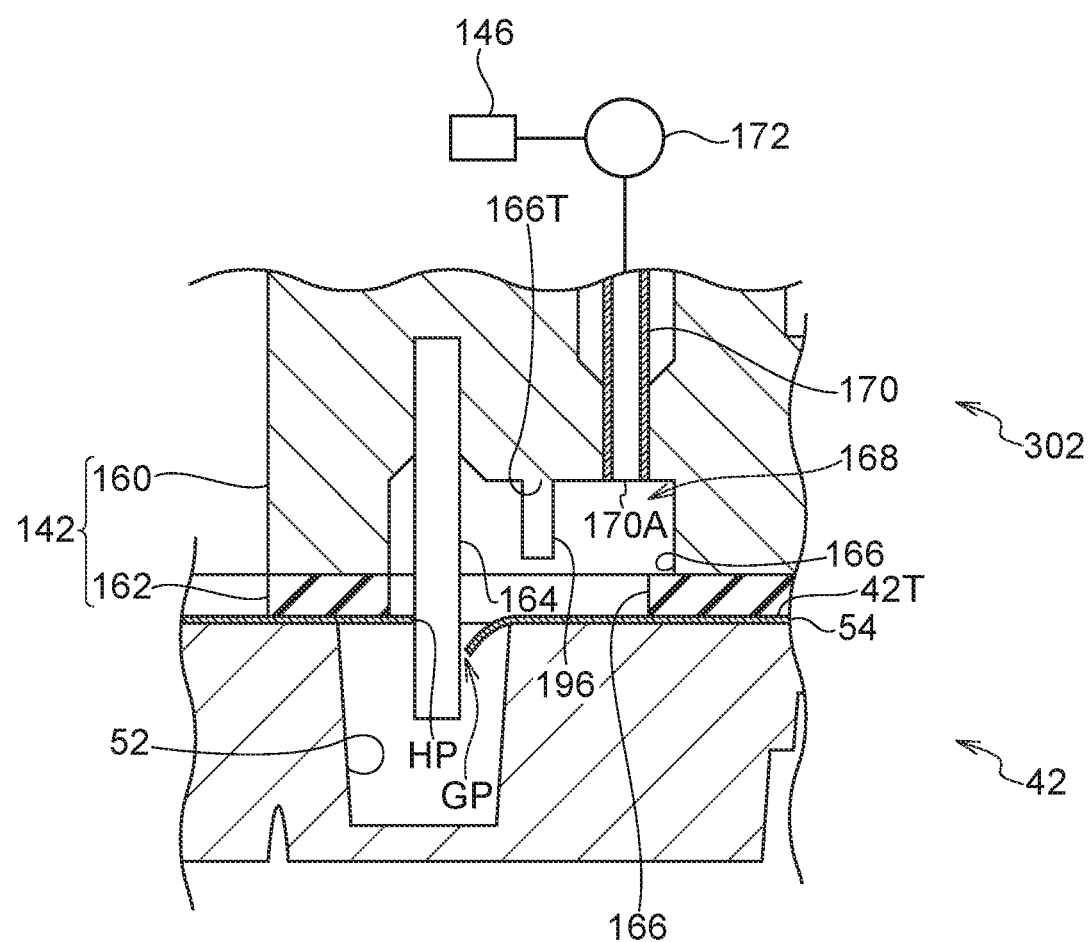
FIG. 24 is a cross-section illustrating a state in which a sealing film has been pierced by a piercing pin in an analysis device of a third exemplary embodiment.

In an analysis device 302 of a third exemplary embodiment, illustrated in FIG. 24, a wall member 196 is formed extending downward from the upper face 166T of each spacing recess 166. The wall member 196 is positioned between the piercing pin 164 and the gas introduction tube 170. The position of a lower end of the wall member 196 is a position that does not contact the sealing film 54, such that a gap is formed between the lower end of the wall member 196 and the sealing film 54.

In the third exemplary embodiment, due to the presence of such a wall member 196, even were liquid that had flowed into an airtight space 168 to move toward the gas introduction tube 170 along the upper face 166T, the liquid would be blocked by the wall member 196. This thereby enables the liquid to be suppressed from flowing into the gas port 170A. The profile of the wall member 196 is not limited, as long as the wall member 196 is positioned between a piercing member, for example, the piercing pin 164, and a gas introduction member, for example, the gas introduction tube 170. Namely, the movement of liquid along the upper face 166T toward the gas introduction tube 170 inside the airtight space 168 can be blocked regardless of the profile of the wall member.

Figure 25:
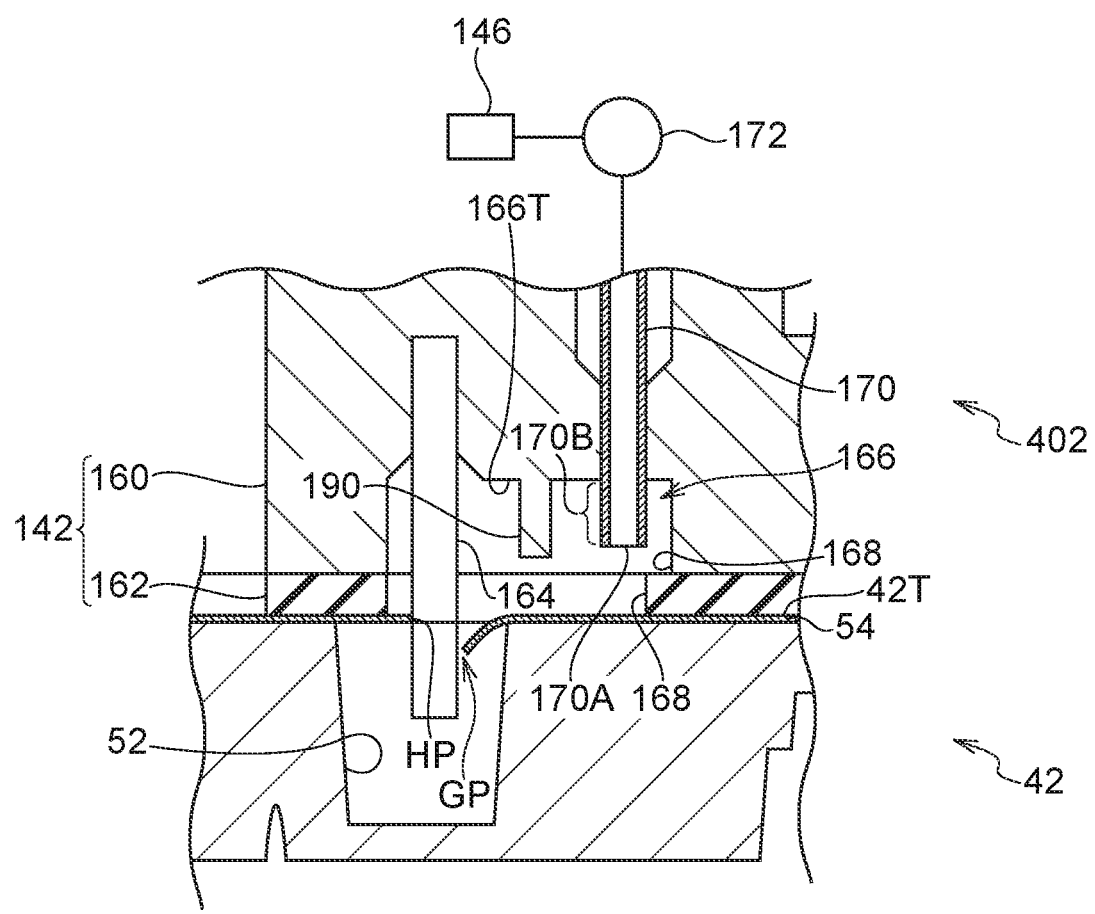
FIG. 25 is a cross-section illustrating a state in which a sealing film has been pierced by a piercing pin in an analysis device of a fourth exemplary embodiment.

An analysis device 402 of a fourth exemplary embodiment, illustrated in FIG. 25, has a structure in which a structure of the second exemplary embodiment is combined with a structure of the third exemplary embodiment in which formation of the wall members 196. The configuration in which the projections 170B are provided at the lower end portions of the gas introduction tubes 170 is shown in FIG. 25. Accordingly, in the fourth exemplary embodiment, liquid that has flowed into an airtight space 168 can be even more reliably suppressed from flowing into the gas port 170A.

Figure 26:
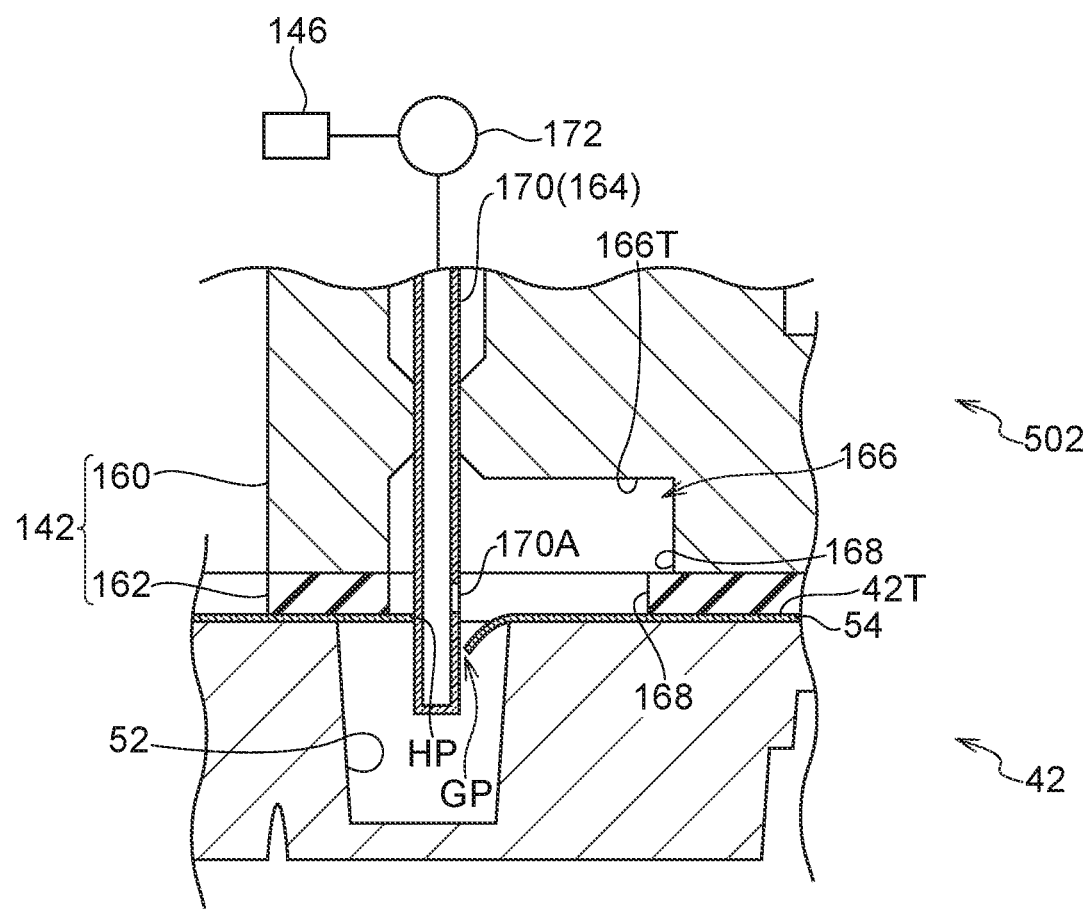
FIG. 26 is a cross-section illustrating a state in which a sealing film has been pierced by a piercing pin in an analysis device of a reference example.

FIG. 26 illustrates part of an analysis device 502 of the reference example. In the structure illustrated in FIG. 26, the gas introduction tubes 170 perform a dual function as the piercing pins 164, enabling the sealing film 54 to be pierced by the leading ends of the gas introduction tubes 170. Moreover, the gas ports 170A are formed in side faces of the gas introduction tubes 170 so as to be positioned above the sealing film 54, namely within the airtight spaces 168.

The gas ports 170A are not positioned in the liquid reservoirs 52 even in the structure of the reference example. This enables liquid from the liquid reservoirs 52 to be suppressed from flowing into the gas ports 170A.

In the first aspect, the one side face of the analysis kit guided into the guide-in section and placed on the placement section so as to be supported in the vertical direction is pushed by the pusher member such that the other side face, which is the face on the opposite side to the one side face, of the analysis kit contacts the contact member, thereby accurately positioning the analysis kit. More accurate analysis is possible since the analysis kit has been positioned in this manner when the measurement member measures the component present in the sample in the analysis kit.

The capillary in the analysis kit is a location through which the sample flows, and is also a location employed in analysis of the component present in the sample. Since the contact member contacts the chip provided with the capillary, the capillary can be accurately positioned.

A second aspect is the first aspect, wherein the contact member includes a protrusion that fits together with a recess formed in the other side face of the analysis kit.

The protrusion configuring the contact member fits together with the recess formed in the other side face of the analysis kit. This thereby enables positional misalignment of the analysis kit to be suppressed in a direction intersecting the direction in which the analysis kit is pushed.

A third aspect is the second aspect, wherein the protrusion is a pin on the guide-in section, the pin projecting from the placement section on which the analysis kit is placed.

The contact member can be configured by a protrusion in a simple structure in which the pin projects from the placement section of the guide-in section. Moreover, employing a rod shaped pin enables the contact member to be disposed in a smaller space than, for example, if a plate shaped contact member were to be employed.

A fourth aspect is either the second aspect or the third aspect, wherein the recess includes an oblique face that is oblique with respect to a direction in which the analysis kit is guided into the guide-in section, and the protrusion contacts the oblique face due to the pushing and moving performed by the pusher member.

The analysis kit is pushed and moved by the pusher member, and the analysis kit continues to move in a state in which the protrusion has contacted the oblique face. Due to the angle of the oblique face, the analysis kit also moves in the direction in which the analysis kit is guided into the guide-in section. Namely, the analysis kit can also be positioned in the direction in which the analysis kit is guided into the guide-in section.

A fifth aspect is of any one of the first aspect to the fourth aspect, further including a tilt detection section that detects tilt with respect to the horizontal direction of the analysis kit guided into the guide-in section.

The tilt detection section detects tilt of the analysis kit with respect to the horizontal direction. Accordingly, for example, in cases in which the analysis kit is tilted, subsequent processing can be halted and the fact that the analysis kit is tilted can be notified.

A sixth aspect is the fifth aspect, wherein the tilt detection section includes plural tilt detection rods that contact the analysis kit in cases in which the analysis kit is tilted in the guide-in section.

Tilt of the analysis kit can be detected with a simple structure in which the tilt detection rods contact the analysis kit. Providing plural of the tilt detection rods enables the detection precision to be suppressed from dropping depending on the tilt direction of the analysis kit.

Namely, the one side face of the analysis kit, which has been guided into the guide-in section, placed on the placement section, and supported in the vertical direction, is pushed by a pusher member, and the other side face, which is the face on the opposite side to the one side face, of the analysis kit is made to contact the contact member, thereby enabling accurate positioning of the analysis kit.

The capillary of the analysis kit is a location through which the sample flows, and is also a location employed in analysis of the component present in the sample. The contact member contacts the chip provided with the capillary, enabling accurate positioning of the capillary.

An eighth aspect is the seventh aspect, wherein the positioning is performed after detecting that the analysis kit guided into the guide-in section is not tilted with respect to the horizontal direction.

The analysis kit is positioned in a state in which the analysis kit is not tilted with respect to the horizontal direction, thereby enabling even more accurate positioning of the analysis kit.

What is claimed is:

1. An analyzer and an analysis kit containing a sample that is inserted into the analyzer to enable analysis of the sample in the analyzer, comprising:
   the analysis kit being a rectangular block shape, the analysis kit comprising:
   a first side face formed with a notch, the notch including two inner faces making the notch shape a triangle shaped profile in plan view,
   a contact portion disposed on the first side face, the contact portion being apart from the notch in a horizontal direction at a distance,
   a second side face being on an opposite side to the first side face, and
   the analyzer comprising:
   a placement mount on which the analysis kit is placed when the analysis kit is in the analyzer and the placement mount having a first mount side face and a second mount side face opposite to the first mount side face;
   a first pin provided in the side of the first mount side face at a higher height than a height of the placement mount, the first pin projecting upward, such that the first pin contacts the inner faces when the analysis kit is placed on the placement mount;
   a second pin provided in the side of the first mount side face at a higher height than a height of the placement mount and apart from the first pin in the horizontal direction at the distance, the second pin projecting upward, such that the second pin contacts the contact portion when the analysis kit is placed on the placement mount;
   a pusher provided to the side of the second mount side face, the pusher opposing to the first pin and the second pin, the pusher pushing the second side face of the analysis kit on the placement mount so that the first pin contacts the inner faces and the second pin contacts with the contact portion wherein only the pusher, first pin, and second pin are configured to position the analysis kit in the analyzer in both the width direction and the depth direction of the analysis kit; and
   a measurement member that measures a component present in the sample in the analysis kit when the analysis kit is placed on the placement mount.

2. The analyzer of claim 1, further comprising
   an opposing wall opposing to the placement mount so that the opposing wall opposes to the analysis kit placed on the placement mount, the opposing wall configured to move toward the placement mount,
   a tilt detection section comprising:
   a plurality of rods projecting from the opposing wall toward the placement mount, the plurality of rods retained to the opposing wall so that each of the rods are capable of moving with respect to the opposing wall and configured to contact with the analysis kit when the opposing wall moves toward the placement mount,
   wherein the tilt detection section is configured to detect a tilt of the analysis kit on the placement mount by detecting the movement of each of the rods.

3. The analyzer of claim 1, wherein another notch is formed on the first side face and the contact portion is the inner face of the another notch.

* * * * *